US011861881B2

United States Patent
Ianni et al.

(10) Patent No.: US 11,861,881 B2
(45) Date of Patent: Jan. 2, 2024

(54) CRITICAL COMPONENT DETECTION USING DEEP LEARNING AND ATTENTION

(71) Applicant: PROSCIA INC., Philadelphia, PA (US)

(72) Inventors: Julianna Ianni, Merchantville, NJ (US); Rajath Elias Soans, Karnataka (IN); Kameswari Devi Ayyagari, San Jose, CA (US); Saul Kohn, Philadelphia, PA (US)

(73) Assignee: PROSCIA INC., Philadelphia, PA (US)

( * ) Notice: Subject to any disclaimer, the term of this patent is extended or adjusted under 35 U.S.C. 154(b) by 0 days.

(21) Appl. No.: 18/246,256

(22) PCT Filed: Sep. 22, 2021

(86) PCT No.: PCT/US2021/051506
§ 371 (c)(1),
(2) Date: Mar. 22, 2023

(87) PCT Pub. No.: WO2022/066736
PCT Pub. Date: Mar. 31, 2022

(65) Prior Publication Data
US 2023/0245431 A1 Aug. 3, 2023

Related U.S. Application Data

(60) Provisional application No. 63/082,125, filed on Sep. 23, 2020.

(51) Int. Cl.
*G06V 10/774* (2022.01)
*G06V 10/82* (2022.01)
(Continued)

(52) U.S. Cl.
CPC .......... *G06V 10/774* (2022.01); *G06N 3/045* (2023.01); *G06N 3/084* (2013.01); *G06T 7/0012* (2013.01);
(Continued)

(58) Field of Classification Search
CPC .... G06V 10/764; G06V 10/774; G06V 10/82; G06T 7/0012; G06T 2207/20081;
(Continued)

(56) References Cited

U.S. PATENT DOCUMENTS 10,453,197 B1   10/2019  Cholakkal et al.
11,042,807 B2    6/2021  Kapur et al.
(Continued)

FOREIGN PATENT DOCUMENTS

CN        110309832 A       10/2019
WO      2019/084697 A1       5/2019
(Continued)

OTHER PUBLICATIONS

Sun et al., "Computer-Aided Diagnosis in Histopathological Images of the Endometrium Using a Convolutional Neural Network and Attention Mechanisms", IEEE Journal of Biomedical and Health Informatics, vol. 24, Issue: 6, Jun. 2020, pp. 1664-1676 (Year: 2020).*

(Continued)

*Primary Examiner* — Nay A Maung
*Assistant Examiner* — Jose M Torres
(74) *Attorney, Agent, or Firm* — MH2 TECHNOLOGY LAW GROUP LLP

(57) ABSTRACT

Techniques for training a first electronic neural network classifier to identify a presence of a particular property in a novel supra-image while ignoring a spurious correlation of the presence of the particular property with a presence of an extraneous property are presented. The techniques include obtaining supra-images; passing each supra-image through a second electronic neural network classifier trained to identify a presence of the extraneous property, such that an attention weight is assigned to each component of the supra-image; identifying, for each supra-image that has a (Continued)

positive classification by the second electronic neural network classifier, a supra-image threshold attention weight, where each component that has a respective attention weight above its supra-image threshold attention weight corresponds to positive classification by the second electronic neural network classifier; removing components of the supra-image that have respective attention weights above their respective supra-image threshold attention weights; and training the first electronic neural network.

20 Claims, 15 Drawing Sheets

(51) Int. Cl.
| | |
|---|---|
| *G06V 10/764* | (2022.01) |
| *G06T 7/00* | (2017.01) |
| *G06N 3/084* | (2023.01) |
| *G06N 3/045* | (2023.01) |

(52) U.S. Cl.
CPC ............ *G06V 10/764* (2022.01); *G06V 10/82* (2022.01); *G06T 2207/20081* (2013.01); *G06T 2207/20084* (2013.01); *G06T 2207/30024* (2013.01); *G06T 2207/30088* (2013.01); *G06T 2207/30096* (2013.01)

(58) Field of Classification Search
CPC . G06T 2207/20084; G06T 2207/30024; G06T 2207/30088; G06T 2207/30096; G06N 3/045; G06N 3/084
See application file for complete search history.

(56) References Cited

U.S. PATENT DOCUMENTS

| | | | |
|---|---|---|---|
| 11,308,619 B2* | 4/2022 | Sainz de Cea | G06N 5/01 |
| 11,309,074 B2 | 4/2022 | Ceballos Lentini et al. | |
| 2017/0124432 A1 | 5/2017 | Chen et al. | |
| 2019/0286880 A1 | 9/2019 | Jackson et al. | |
| 2019/0325621 A1 | 10/2019 | Wang et al. | |
| 2019/0347847 A1 | 11/2019 | Elgharib et al. | |
| 2020/0027207 A1* | 1/2020 | Zhang | G06F 18/2135 |
| 2020/0058126 A1 | 2/2020 | Wang et al. | |
| 2020/0129263 A1 | 4/2020 | Izadyyazdanabadi et al. | |
| 2020/0160032 A1 | 5/2020 | Allen et al. | |
| 2020/0167972 A1 | 5/2020 | Birnhack et al. | |
| 2020/0226422 A1 | 7/2020 | Li et al. | |
| 2020/0272864 A1 | 8/2020 | Faust et al. | |
| 2020/0294231 A1 | 9/2020 | Tosun et al. | |
| 2020/0342359 A1* | 10/2020 | Hu | G06N 20/10 |
| 2020/0388029 A1 | 12/2020 | Saltz et al. | |
| 2020/0388033 A1 | 12/2020 | Matlock et al. | |
| 2021/0027098 A1 | 1/2021 | Ge et al. | |
| 2021/0043331 A1 | 2/2021 | Ozcan et al. | |
| 2021/0089744 A1 | 3/2021 | Anni et al. | |
| 2021/0090250 A1 | 3/2021 | Soans et al. | |
| 2021/0166785 A1* | 6/2021 | Yip | G06T 11/206 |
| 2021/0209760 A1 | 7/2021 | Sue et al. | |
| 2021/0217212 A1 | 7/2021 | Birnhack et al. | |
| 2023/0082179 A1* | 3/2023 | Laradji | G06V 10/764 |

FOREIGN PATENT DOCUMENTS

| | | |
|---|---|---|
| WO | 2020/014477 A1 | 1/2020 |
| WO | 2020/182710 A1 | 9/2020 |
| WO | 2020/193708 A1 | 10/2020 |
| WO | 2020/229585 A1 | 11/2020 |
| WO | 2022/061083 A1 | 3/2022 |
| WO | 2022/066725 A1 | 3/2022 |

OTHER PUBLICATIONS

Ji, J., "Gradient-based Interpretation on Convolutional Neural Network for Classification of Pathological Images," 2019 International Conference on Information Technology and Computer Application (ITCA), IEEE, 2019, pp. 83-86 (retrieved from the internet on Nov. 21, 2021), <URL: https://ieeexplore.ieee.org/stamp/stamp.jsp?tp=&arnumber=9092504>.
International Search Report and Written Opinion of the International Searching Authority dated Dec. 22, 2021 in International Apln. No. PCT/US2021/051495, 8 pages.
International Search Report and Written Opinion of the International Searching Authority dated Dec. 17, 2021 in International Apln. No. PCT/US2021/050828, 10 pages.
International Search Report and Written Opinion of the International Searching Authority dated Dec. 27, 2021 in International Apln. No. PCT/US2021/051506, 9 pages.
Samsi, S., et al., "Colorization of H&E stained tissue using Deep Learning," 2018 40th Annual International Conference of the IEEE Engineering in Medicine and Biology Society (EMBC), IEEE, 2018, pp. 640-643.
Tellez, D., et al., "Quantifying the effects of data augmentation and stain color normalization in convolutional neural networks for computational pathology," arXiv:1902.06543v1 [cs.CV], Feb. 18, 2019, pp. 1-12.
Extended European Search Report dated Feb. 12, 2021 in European Apln. No. 20197904.4, 8 pages.
Yuan, E., et al., "Neural Stain Normalization and Unsupervised Classification of Cell Nuclei in Histopathological Breast Cancer Images," arXiv:1811.03815v1 [cs.CV], Nov. 9, 2018, pp. 1-9.
Zhang, R., et al., "Colorful Image Colorization," arXiv:1603.08511v5 [cs.CV], Oct. 5, 2016, pp. 1-29.
Extended European Search Report dated Feb. 8, 2021 in European Apln. No. 20197903.6 , 9 pages.
Gal, Y., et al., "Dropout as a Bayesian Approximation: Representing Model Uncertainty in Deep Learning," Proceedings of the 33rd International Conference on Machine Learning, vol. 48, 2016, 10 pages.
lu et al., "Deep Learning-based Computational Pathology Predicts Origins for Cancers of Unknown Primary," arXiv:2006.13932v2 [q-bio.TO] Jun. 29, 2020, 33 pages.
Beluch, W.H., et al., "The power of ensembles for active learning in image classification," 2018 IEEE/CVF Conference on Computer Vision and Pattern Recognition, IEEE, Jun. 18, 2018, pp. 9368-9377.
European Communication pursuant to Article 94(3) EPC (Examination Report) dated Apr. 4, 2023, for European Application No. 20197903.6 (6 pages).
Gupta, A., et al., "Deep Learning in Image Cytometry: A Review," Cytometry Part A, vol. 95, Issue 4, Special Issue: Image Cytometry, Apr. 2019 (Published online Dec. 19, 2018), pp. 366-380 (16 pages provided).
Leibig, C., et al., "Leveraging uncertainty information from deep neural networks for disease detection," Scientific Reports, vol. 7, Article 17816, 2017 (Published online Dec. 19, 2017), pp. 1-14.

\* cited by examiner

CRITICAL COMPONENT DETECTION USING DEEP LEARNING AND ATTENTION

RELATED APPLICATION

This application is a national stage application under 35 U.S.C. § 371 of PCT/US2021/051506, filed Sep. 22, 2021, and entitled "Critical Component Detection Using Deep Learning and Attention," which claims priority to, and the benefit of, U.S. Provisional Patent Application No. 63/082,125, filed Sep. 23, 2020, and entitled, "Critical Component Detection Using Deep Learning and Attention."

FIELD

This disclosure relates generally to machine learning, e.g., in the context of pathology, such as dermatopathology.

BACKGROUND

Much recent research has advanced the application of deep learning techniques for classification problems in digital pathology, satellite imaging, and other fields that use gigapixel images with weak labels (e.g., labels at the level of the supra-image). While until recently, deep learning techniques for these applications required time-consuming pixel-wise annotations of positive regions of interest within these images for training, now multiple-instance learning techniques allow division of one or several images into patches or tiles, which are then treated as instances or components when training neural networks in this paradigm; but one label at an image, or specimen (or supra-image, comprising several images) level is required.

Multiple instance learning techniques typically frame problems as considering a collection of components, which can be either positive or negative for the property at issue. A positive collection of components is one that has at least one positive component (plus zero or more negative components), and a negative collection of components is one that does not have any positive components (plus one or more negative components).

In the context of digital pathology, multiple instance learning in conjunction with an attention mechanism, e.g., as in models like that introduced in Maximilian Ilse, Jakub M. Tomczak, and Max Welling, *Attention-based Deep Multiple Instance Learning*, arXiv:1802.04712, has recently shown success in the classification of extremely large images like those found in digital pathology or satellite imagery. Such models include an attention layer, which allows the neural network to learn how important each component is to the final collection-level classification of positive or negative; essentially, the attention layer can learn to focus on potentially positive components as important to a prediction and largely ignore the negative components. The network does this by learning to calculate an assigned attention weight for each component; accordingly, each component has an attention number associated with its importance to the prediction.

SUMMARY

According to various embodiments, a method of training a first electronic neural network classifier to identify a presence of a particular property in a novel supra-image while ignoring a spurious correlation of the presence of the particular property with a presence of an extraneous property is presented. The method includes obtaining a training corpus of a plurality of supra-images, each supra-image including at least one image, each image of each of the at least one image corresponding to a respective plurality of components, where the respective plurality of components for each image of each of the at least one image of each supra-image of the training corpus collectively form a supra-image plurality of components; passing each respective supra-image of the plurality of supra-images of the training corpus through a second electronic neural network classifier trained to identify a presence of the extraneous property, the second electronic neural network classifier including an attention layer, whereby the attention layer assigns a respective attention weight to each component of the supra-image plurality of components; identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, where each individual component of the supra-image plurality of components that has a respective attention weight above its respective supra-image threshold attention weight corresponds to positive classification by the second electronic neural network classifier, and where each individual component of the supra-image plurality of components that has a respective attention weight below its respective supra-image threshold attention weight corresponds to negative classification by the second electronic neural network classifier; removing components of the supra-image plurality of components that have respective attention weights above their respective supra-image threshold attention weights to obtain a scrubbed training corpus; and training the first electronic neural network classifier to identify the presence of the particular property using the scrubbed training corpus.

Various optional features of the above embodiments include the following. The extraneous property may include a pen marking. The identifying, for each supra-image of the plurality of supra-images of the training corpus that have a positive classification by the second electronic neural network classifier, a respective supra-image threshold attention weight, may include conducting, for each supra-image of the plurality of supra-images of the training corpus, a respective binary search of its components. The conducting, for each supra-image of the plurality of supra-images of the training corpus, a respective binary search of its components may include: ordering components of each supra-image of the plurality of supra-images of the training corpus according to their respective attention weights to form a respective ordered sequence for each supra-image of the plurality of supra-images of the training corpus; and iterating, for each respective ordered sequence: splitting the respective ordered sequence into a respective low part and a respective high part, passing the respective low part through the second electronic neural network classifier to obtain a respective low part classification, setting the respective ordered sequence to its respective low part when its respective low part classification is positive, and setting the respective ordered sequence to its respective high part when its respective low part classification is not positive. Each component of the supra-image plurality of components may include a 128-pixel-by-128-pixel square portion of an image. Each component of the supra-image plurality of components may include a feature vector corresponding to a portion of an image. The training corpus may include a plurality of biopsy supra-images. The particular property may include a dermatopathology property. The dermatopathology property may include one of: a presence of a malignancy, a presence of a specific grade of malignancy, or a presence of a category of risk. The method may further include identifying the presence of the particular property in the novel supra-image by submitting the novel supra-image to the first electronic neural network classifier.

According to various embodiments, a system for training a first electronic neural network classifier to identify a presence of a particular property in a novel supra-image while ignoring a spurious correlation of the presence of the particular property with a presence of an extraneous property is presented. The system includes a processor; and a memory communicatively coupled to the processor, the memory storing instructions which, when executed on the processor, perform operations including: obtaining a training corpus of a plurality of supra-images, each supra-image including at least one image, each image of each of the at least one image corresponding to a respective plurality of components, where the respective plurality of components for each image of each of the at least one image of each supra-image of the training corpus collectively form a supra-image plurality of components; passing each respective supra-image of the plurality of supra-images of the training corpus through a second electronic neural network classifier trained to identify a presence of the extraneous property, the second electronic neural network classifier including an attention layer, whereby the attention layer assigns a respective attention weight to each component of the supra-image plurality of components; identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, where each individual component of the supra-image plurality of components that has a respective attention weight above its respective supra-image threshold attention weight corresponds to positive classification by the second electronic neural network classifier, and where each individual component of the supra-image plurality of components that has a respective attention weight below its respective supra-image threshold attention weight corresponds to negative classification by the second electronic neural network classifier; removing components of the supra-image plurality of components that have respective attention weights above their respective supra-image threshold attention weights to obtain a scrubbed training corpus; and training the first electronic neural network classifier to identify the presence of the particular property using the scrubbed training corpus.

Various optional features of the above embodiments include the following. The extraneous property may include a pen marking. The identifying, for each supra-image of the plurality of supra-images of the training corpus that have a positive classification by the second electronic neural network classifier, a respective supra-image threshold attention weight may include conducting, for each supra-image of the plurality of supra-images of the training corpus, a respective binary search of its components. The conducting, for each supra-image of the plurality of supra-images of the training corpus, a respective binary search of its components may include: ordering components of each supra-image of the plurality of supra-images of the training corpus according to their respective attention weights to form a respective ordered sequence for each supra-image of the plurality of supra-images of the training corpus; and iterating, for each respective ordered sequence: splitting the respective ordered sequence into a respective low part and a respective high part, passing the respective low part through the second electronic neural network classifier to obtain a respective low part classification, setting the respective ordered sequence to its respective low part when its respective low part classification is positive, and setting the respective ordered sequence to its respective high part when its respective low part classification is not positive. Each component of the supra-image plurality of components may include a 128-pixel-by-128-pixel square portion of an image. Each component of the supra-image plurality of components may include a feature vector corresponding to a portion of an image. The training corpus may include a plurality of biopsy supra-images. The particular property may include a dermatopathology property. The dermatopathology property may include one of: a presence of a malignancy, a presence of a specific grade of malignancy, or a presence of a category of risk. The operations may further include identifying the presence of the particular property in the novel supra-image by submitting the novel supra-image to the first electronic neural network classifier.

BRIEF DESCRIPTION OF THE DRAWINGS

The above and/or other aspects and advantages will become more apparent and more readily appreciated from the following detailed description of examples, taken in conjunction with the accompanying drawings, in which.

DESCRIPTION OF THE EMBODIMENTS

Reference will now be made in detail to example implementations. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction and Overview

Pathologists commonly use pen ink to indicate malignant regions in images, such as biopsy images. Deep learning models trained with such images can erroneously learn that ink is evidence of malignancy. Therefore, some embodiments train a weakly-supervised attention-based neural network under a multiple-instance learning paradigm to detect pen ink on images. Such pen ink can then be removed from the images, and the scrubbed images used to train a second neural network to detect malignancy, without inadvertently training the second network to erroneously identify pen ink as malignancy.

More generally, embodiments can be used to train a neural network to detect critical components in images, e.g., components that are by themselves determinative of a classification of the images. Such embodiments can identify, e.g., by annotating images, such critical components.

These and other features and advantages are disclosed in detail herein.

Figure 1:
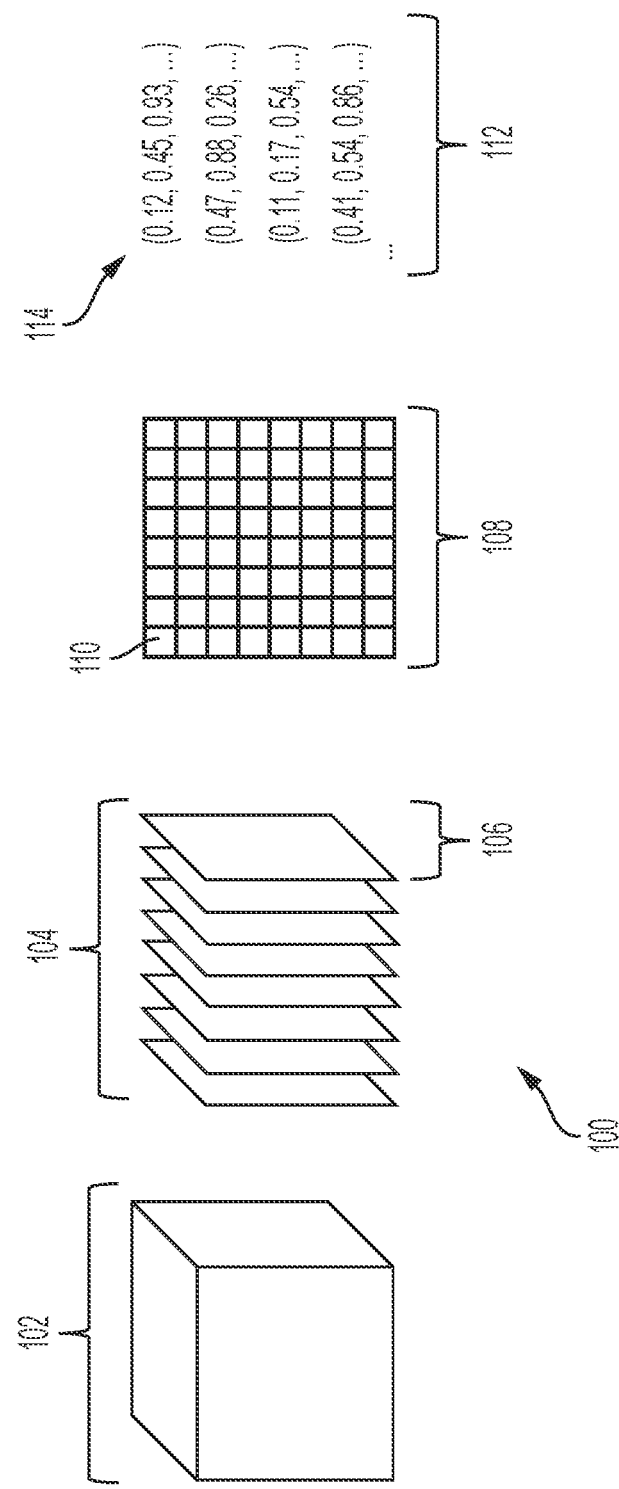
FIG. 1 is a schematic diagram depicting an example supra-image, its constituent images, a tiling of one of its constituent images, and vector representations of the tiles of the constituent image according to various embodiments.

FIG. 1 is a schematic diagram 100 depicting an example supra-image 102, its constituent images 104, a tiling 108 of one of its constituent images 106, and vector representations 112 of the tiles of the constituent image 106 according to various embodiments. As used herein, the term "supra-image" includes one or more constituent images of a specimen. The specimen may be a medical specimen, a landscape specimen, or any other specimen amenable to image capture. For example, a supra-image may represent images from a single resection or biopsy (the supra-image) constituting several slides (the constituent images). As another example, the supra-image may be a three-dimensional volume representing the results of a radiological scan, and the constituent images may include two-dimensional slices of the three-dimensional volume. Within the domain of digital pathology, the images forming a supra-image may be of tissue stained with Hematoxylin and Eosin (H&E), and a label may be associated with the supra-image, for example, the diagnosis rendered by the pathologist. Frequently, more tissue is cut than can be scanned in a single slide—this is especially frequent for suspected malignant cases—and several images may share the same weak label. A supra-image may be of any type of specimen in any field, not limited to pathology, e.g., a set of satellite images.

As shown in, FIG. 1, supra-image 102 may represent a three-dimensional volume by way of non-limiting examples. Supra-image 102 may be, for example, a representation of a three-dimensional Computer Tomography (CT) or Magnetic Resonance Imaging (MRI) scan. Images 104 represent the constituent images of supra-image 102. By way of non-limiting examples, images 104 may be slices derived from, or used to derive, a CT or MRI scan, or may be whole-slide images, e.g., representing multiple images from a biopsy of a single specimen.

In general, when processed by a computer, each constituent image of a supra-image may be broken down into a number of tiles, which may be, e.g., 128 pixels by 128 pixels. As shown in FIG. 1, image 106 of constituent images 104 may be partitioned into tiles, such as tile 110, to form partitioned image 108.

In general, an individual tile may be represented by one or more corresponding feature vectors. Such feature vectors may be obtained from tiles using a separate neural network, trained to produce feature vectors from tiles. Each such feature vector may encode the presence or absence of one or more features in the tile that it represents. Each feature vector may be in the form of a tuple of numbers. As shown in FIG. 1, feature vectors 112 represent the tiles of partitioned image 108. For example feature vector 114 may correspond to and represent a presence or absence of a particular feature in tile 110.

Both tiles and their representative feature vectors are examples of "components" as that term is used herein. According to some embodiments, each component is implemented as a tile of a constituent image of a supra-image. According to some embodiments, each component is implemented as a vector, such as a feature vector, that represents a respective tile in a constituent image of a supra-image.

Current hardware (e.g., Graphical Processing Units or GPUs) commonly used to train neural networks cannot always hold all the image tiles from a supra-image or constituent image at once due to Random Access Memory (RAM) limitations. For example, each image of a supra-image is typically too large to feed into the hardware used to hold and train the deep learning neural network. Some embodiments train a weakly supervised neural network at the supra-image level, within these hardware limitations, by sampling (e.g., randomly sampling) components from constituent images of supra-images into collections of components that are close to the maximum size the hardware is able to hold in RAM.

The random sampling may not take into account which image from a supra-image the components are drawn from; components may be randomly drawn without replacement from a common pool for the supra-image. The sampling can be performed several times for a given supra-image, creating more than one collection to train with for a given supra-image. Multiple such collections may form a partition of a given supra-image; that is, the set-theoretic union of the collections from a single supra-image may cover the entire supra-image, and the set-theoretic intersection of such collections may be empty.

A. Multi-Instance Supra-Image Level Learning

While previous work in multiple-instance learning has been limited to training at the level of small image patches, or subsets of an image identified by a pre-processing step or network, embodiments may utilize tile-based multiple-instance learning training at the supra-image level, which does not require selecting out small regions of interest.

Datasets that contain large numbers of high-resolution images, such as neural network training corpora, can be extremely costly to annotate in detail. A time-saving and cost-saving alternative to annotations is to supply weak labels to the images or supra-images, simply stating whether or not certain features are present.

In past work, weakly-supervised networks were trained to operate either only in the specific case of a weak label per-image, or trained using a downstream classifier or alternative numerical method to combine the output of a weakly-supervised classifier from the image level to the supra-image level. The former case clearly restricts the usability of a trained network, while the latter relies on two models' or methods' performance to generate and combine image-level classifications to produce a representative supra-image level classification.

None of these prior methods of artificial intelligence training allow for training based on how diagnoses are made in clinical practice, where the pathologist renders a diagnosis for each specimen only, not for each individual slide pertaining to that specimen. This diagnosis may be stored in an electronic clinical records system, such as a Laboratory Information System ("LIS"), a Laboratory Information Management System ("LIMS"), an Electronic Medical Record ("EMR") system. By abstracting training to the specimen level, some embodiments provide a training method that may operate on diagnoses made straight from an electronic clinical records system, without the requirement of human intervention to label relevant slides. That is, some embodiments may use as a training corpus of supra-images with weak labels taken from diagnoses stored in an electronic clinical records system.

Some embodiments provide a framework in which each image in a supra-image is divided into a mosaic of tiles, e.g., squares of 128 pixels-per-side. A sampled collection of such tiles, or feature vector representations thereof, small enough to be stored in the available volatile memory of the training computer, and labeled with the label of the supra-image from which the tiles are obtained, may serve as a single element of the training corpus for weakly-supervised training according to various embodiments. Multiple such labeled collections of components may comprise a full training corpus. No region-of-interest need be identified.

While embodiments may be applied within the domain of digital pathology, the supra-image methods disclosed herein generalize to other fields with problems that involve several images with shared labels, such as time series of satellite images.

B. Attention and Critical Components

This disclosure presents techniques for automatically identifying critical components in images that are dispositive of classification of the images (or supra-images made up of the images). Some embodiments provide a neural network trained to identify such critical components. Embodiments may be used to identify critical components that are sufficient for classifying an image (or supra-image) into a particular class by a trained neural network.

Figure 2:
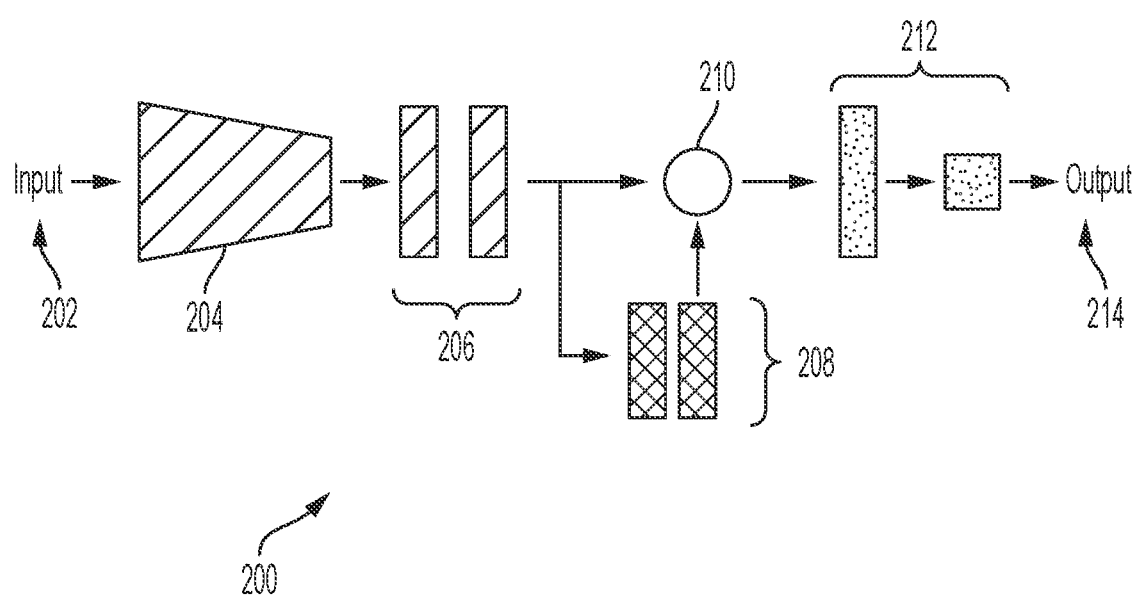
FIG. 2 is a schematic diagram of a neural network that includes attention layers according to various embodiments.

FIG. 2 is schematic diagram of a neural network 200 that includes attention layers 208 according to various embodiments. For example, any of methods 300, 400, 500, and 700 may be implemented using neural network 200. Neural network 200 may be implemented on hardware such as system 900.

Neural network 200 accepts an input 202. The input 202 may be a set of sampled components, such as tiles or feature vectors, from a constituent image of a supra-image. The set of components may be a proper subset of a partition of the image and may be randomly sampled. The components provided as input 202 may be used for training the neural network 200, e.g., as part of method 300, or for classification of their image or supra-image, e.g., as part of any of methods 400, 500, or 700.

Neural network passes the input 202 to convolutional layers 204. Convolutional layers 204 include multiple layers of convolutions that, during training, apply filters to learn high-level features from components, such as tiles. During classification, convolutional layers 204 apply the filters to a novel input 202 from a novel image or supra-image that causes an activation in convolutional layers 204, and repeated activations may generate a feature map, which identifies features of interest in the novel image or supra-image.

Neural network passes outputs from convolutional layers 204 to fully connected layers 206. Fully connected layers 206 convert flattened convolutional features for each component into lower dimensional vectors. The output of fully connected layers 206 is passed to self-attention module 210 and to attention layers 208, which may be implemented as fully connected layers for attention.

Attention layers 208 convert lower dimensional vectors for each component into a scalar floating point attention weight, which may be in the range from zero to one, inclusive.

Self-attention module 210 computes the scalar product of lower dimensional features and scalar weights to get an aggregated representation of a supra-image. The aggregated representation is passed to final fully connected layers 212.

Final fully connected layers 202 convert the aggregated representation received from self-attention module 210 into a final prediction. The final prediction is then passed as an output 214. During training, the output 214 can be compared with an actual classification to train a model as described in detail herein in reference to FIG. 3. During classification, the output 214 may be used as a classification of the input image or supra-image.

In general, in deep learning machine learning neural networks with attention, the attention layers, such as attention layers 208, assign an attention weight to each component. (In the case of a multi-class or multi-task model, embodiments may have more than one attention layer that is class or task-dependent, and therefore more than one attention weight per component. These different attention layers might be trained to highlight different features.) For supra-images, potentially spanning multiple whole-slide images, individual tiles or their representative feature vectors may be assigned an attention weight.

The attention layers allow the model to focus on the most relevant regions of interest in the image or specimen during the training procedure. This increases model interpretability by capturing which tiles or regions were considered important when performing the classification task. It also allows for feeding a model a large amount of information (e.g., one or several whole-slide images), while having it learn which regions are relevant and which regions are not.

Due to the way the model is trained, the learned attention weights reflect the relative importance of each tile's contribution to the model's overall prediction for a whole-slide image. So, within a given image or specimen, the component with the highest attention weight contributes the most to the model's decision, while the component with the lowest attention weight contributes the least to the model's decision. These weights may be used in direct fashion to visualize the trained model's predicted regions of interest or attention on an image, e.g., as a heat map, without the need for any pixel-wise annotations during training.

However, while a direct use of the attention weights predicted by a model to generate a map can provide an impression of the relative importance of tiles to the model's prediction, it gives no concept of absolute importance, e.g., whether a particular component's presence in an image is determinative of the image's classification. What a pathologist really wants to know when they examine these attention weights—or a map of the attention weights laid over the image—are often answers to the questions: Are there signs of tumor in this region? Would any given tile or region, alone, be enough to come to the same conclusion as to whether the specimen indicates cancer? Does the evidence within a tile or specific region indicate some other type of classification?

To answer these sorts of questions, some embodiments provide techniques to highlight components that contribute to—or are sufficient for—the model's prediction. Beyond just identifying components that are helpful for, or correlated with, a prediction, some embodiments can identify one or more components that are sufficient on their own for a model's classification. This is accomplished by testing collections (e.g., subsets) of the components on which a prediction is to be made. If a whole-slide image (i.e., all of the components of a whole-slide image) are associated with a prediction D by a trained multiple instance learning model, it is desirable to know which region(s) (or subset(s) of tiles) specifically resulted in the prediction D. Some embodiments accomplish this by iteratively predicting on smaller subsets of tiles of varying attention weights, until they determine a threshold on attention weight below which tiles are not associated with a positive prediction. The set of tiles above this threshold corresponds to tiles that result in a positive classification for the whole-slide image, even if only a single one of them were to be evaluated by the model. In other words, for the tumor problem, an embodiment can predict that any tile with an attention weight above this threshold contains standalone evidence of a tumor (or evidence of whatever the model was trained to predict).

C. Spuriously Correlated Feature Removal

Artificial Intelligence has proven to be a useful tool in tackling several problems in fields such as computational histopathology. Despite its success, it has been recently identified that artifacts on whole-slide images adversely affect machine learning models. Several deep learning based solutions have been proposed in the literature to tackle this problem, but such solutions either require hand crafted features or finer labels than slide-level labels.

Pen ink can be particularly problematic when attempting to train a weakly-supervised machine learning model to do something like cancer detection, because often pen ink is used by pathologists or residents to mark regions of cancerous morphology in a supra-image. Therefore, pen ink represents a spurious correlation with the actual features of which detection is desired, namely, regions showing cancerous morphology. A weakly-supervised model, which does not rely on pixel-wise annotations for training, is prone to incorrectly identifying instances of pen ink and similar spurious correlates of the desired target as positive components, of themselves indicative of cancer. Because of this tendency of weakly supervised models, it is desirable to eliminate pen ink from training corpora.

Some embodiments provide a neural network trained to remove confounding features—such as pen ink—from images. Such embodiments may provide a first neural network that can classify images as either including or not including certain features that are spuriously correlated with the presence of features of interest. The first neural network can identify particular components that include the spuriously correlated confounding features, and the components that include such features can then be removed. The resulting images (or their supra-images) can then be used to train a second neural network to classify images as including or not including the feature of interest.

Some embodiments use weakly-supervised, multiple-instance learning coupled with deep features to remove pen ink from pathology images automatically and without annotations. The applied technique is not color-dependent, requires no annotations to train, and does not need hand-crafted or heuristic features to select inked regions.

II. Example Embodiments

Figure 3:
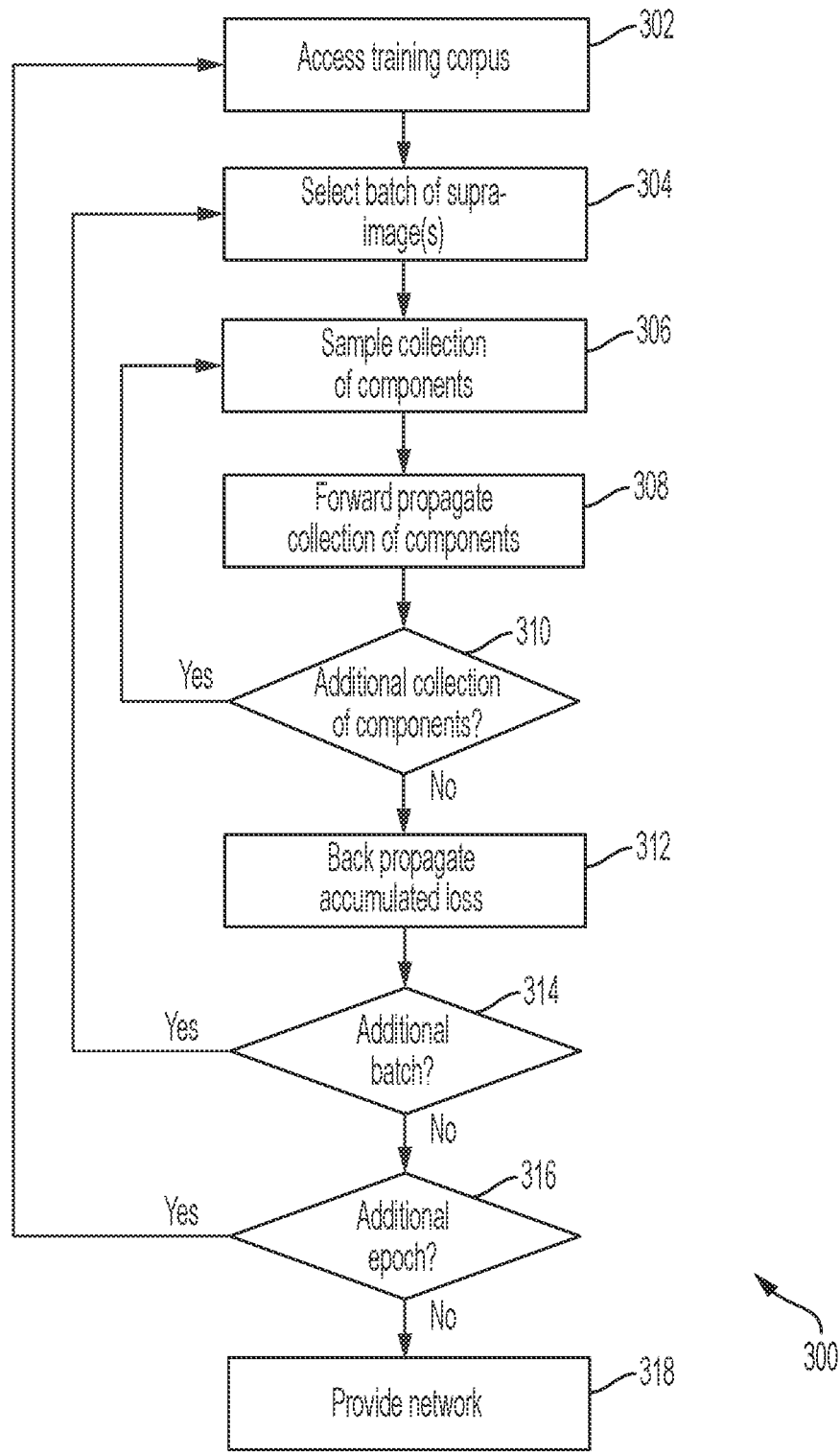
FIG. 3 is a flow diagram for a method of iteratively training, at the supra-image level, a neural network to classify supra-images for the presence of a property according to various embodiments.

FIG. 3 is a flow diagram for a method 300 of iteratively training, at the supra-image level, a neural network to classify supra-images for the presence of a property according to various embodiments. Method 300 may be used to generate models that may be used to implement methods 400, 500, and 700, for example. Method 300 may be implemented by system 900, as shown and described herein in reference to FIG. 9. Method 300 may extend component-based multiple-instance learning training to the supra-image level, which does not require selecting out small regions of interest, manually, or otherwise.

At block 302, method 300 accesses a training corpus of supra-images. The supra-images may be in any field of interest. The supra-images include or may be otherwise associated with weak labels. The supra-images and weak labels may be obtained from an electronic clinical records system, such as an LIS. The supra-images maybe accessed over a network communication link, or from electronic persistent memory, by way of non-limiting examples. The training corpus may include hundreds, thousands, or even tens of thousands or more supra-images. The training corpus of supra-images may have previously been determined to be sufficient, e.g., by employing method 200 as shown and described herein in reference to FIG. 2.

At 304, method 300 selects a batch of supra-images for processing. In general, the training corpus of supra-images with supra-image level labels to be used for training is divided into one or more batches of one or more supra-images. In general, during training, the loss incurred by the network is computed over all batches through the actions of 304, 306, 308, 310, 312, and 314. The losses over all of the batches are accumulated, and then the weights and biases of the network are updated, at which point the accumulated loss is reset, and the process repeats until the iteration is complete.

At 306, method 300 samples, e.g., randomly samples, a collection of components from the batch of supra-images selected at 304. In general, each batch of supra-images is identified with a respective batch of collections of components, where each collection of components includes one or more components sampled, e.g., randomly sampled, from one or more images from a single supra-image in the batch of supra-images. Thus, the term "batch" may refer to both a batch of one or more supra-images and a corresponding batch of collections of components from the batch of one or more supra-images. Embodiments may not take into account which constituent image a given component in a collection comes from; components in the collection may be randomly drawn without replacement from a common pool for a given supra-image. Each collection of components is labeled according to the label of the supra-image making up the images from which the components from the collection are drawn. The components may be tiles of images within the selected supra-image batch, or may be feature vectors representative thereof. The collections of components, when implemented as tiles, may form a partition of a given supra-image, and when implemented as vectors, the corresponding tiles may form a partition.

Embodiments may iterate through a single batch, i.e., a batch of collections of components, through the actions of 306, 308, and 310, until all components from the images of the supra-images for the batch are included in some collection of components that is forward propagated through the network. Embodiments may iterate through all of the batches through the actions of 304, 306, 308, 310, 312, and 314 to access the entire training dataset to completely train a network.

Thus, at 308, the collection of components sampled at 306 is forward propagated through the neural network to compute loss. When the collection of components that is forward propagated through the multiple-instance learning neural network, the network's prediction is compared to the weak label for the collection. The more incorrect it is, the larger the loss value. Such a loss value is accumulated each time a collection of components is propagated through the network, until all collections of components in the batch are used.

At 310, method 300 determines whether there are additional collections of components from the batch selected at 304 that have not yet been processed. If so, control reverts to 306, where another collection of components is selected for processing as described above. If not, then control passes to 312.

At 312, method 300 back propagates the accumulated loss to update the weights and biases of the neural network. That is, after iterating through the collections of components from a single batch, the neural network weights and biases are updated according to the magnitude of the aggregated loss. This process may repeat over all batches in the dataset.

Thus, at 314, method 300 determines whether there are additional batches of supra-images from the training corpus accessed at 302 that have not yet been processed during the current iteration. Embodiments may iterate over the batches to access the entire training dataset. If additional batches exist, then control reverts to 304, where another batch of one or more supra-images is selected. Otherwise, control passes to 316.

At 316, once all collections of components from all batches of supra-images are processed according to 304, 306, 308, 310, 312, and 314, a determination is made as to whether an additional epoch is to be performed. In general, each iteration over all batches of supra-images in the training corpus may be referred to as an "epoch". Embodiments may train the neural networks for hundreds, or even thousands or more, of epochs.

At 318, method 300 provides the neural network that has been trained using the training corpus accessed at 302. Method 300 may provide the trained neural network in a variety of ways. According to some embodiments, the trained neural network is stored in electronic persistent memory. According to some embodiments, the neural network is made available on a network, such as the internet. According to some such embodiments, an interface to the trained neural network is provided, such as a Graphical User Interface (GUI) or Application Program Interface (API).

Figure 4:
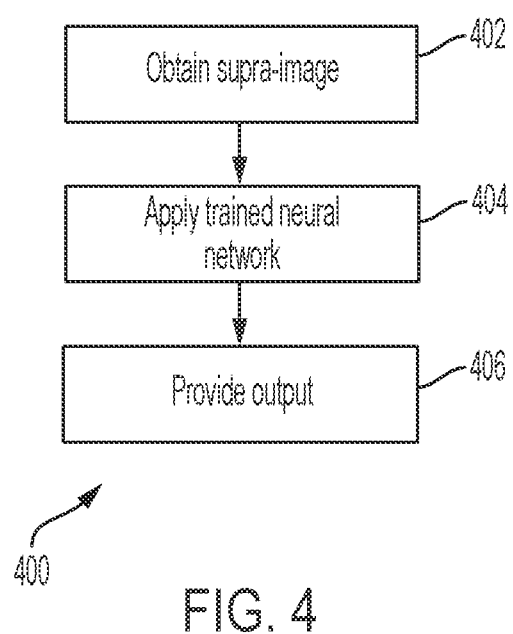
FIG. 4 is a flow diagram for a method of automatically classifying a supra-image according to various embodiments.

FIG. 4 is a flow diagram for a method 400 of automatically classifying a supra-image according to various embodiments. Method 400 may use a neural network trained according to method 300 as shown and described herein in reference to FIG. 3. Method 400 may be implemented by system 900, as shown and described herein in reference to FIG. 9.

At 402, a supra-image is obtained. The supra-image may be in any field. The supra-image may be obtained over a network link or by retrieval from persistent storage, by way of non-limiting example.

At 404, the neural network is applied to the supra-image obtained at 402. To do so, the supra-image may be broken down into parts (e.g., components or sets of components) and the parts may be individually passed through the network up to a particular layer, where the features from the various parts are aggregated, and then the parts are passed through to a further particular layer, where the features are again aggregated, until all parts are passed and all features aggregated such that one or more outputs are produced. Multiple outputs, if present, may be independently useful, or may be synthesized to produce a final, single output.

At 406, method 400 provides the output. The output may be provided by displaying a corresponding datum to a user of method 400, e.g., on a computer monitor. Such a datum may indicate the presence or absence of the feature of interest in the supra-image.

Figure 5:
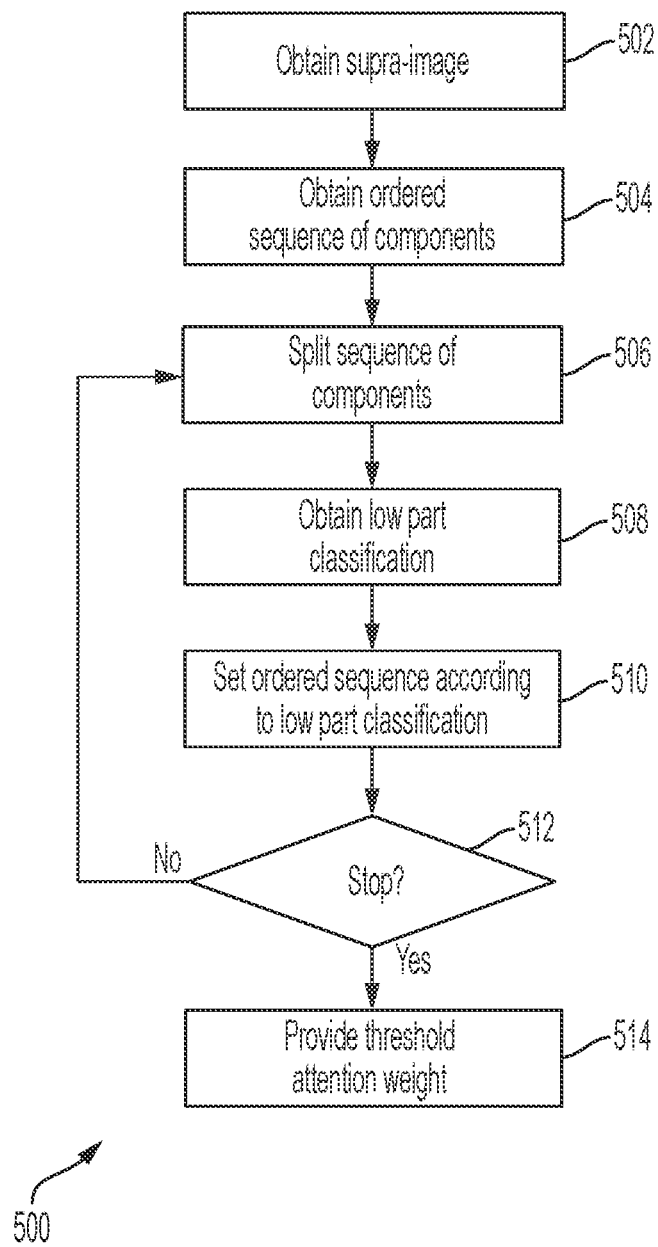
FIG. 5 is a flow diagram for a method of determining a threshold attention weight for a positively classified supra-image according to various embodiments.

FIG. 5 is a flow diagram for a method 500 of determining a threshold attention weight for a positively classified supra-image according to various embodiments. Method 500 may be performed for any classifier that includes an attention layer, such as neural network 200 as shown and described above in reference to FIG. 2. Method 500 may use a neural network trained according to method 300 as shown and described herein in reference to FIG. 3. Method 500 may be implemented by system 900, as shown and described herein in reference to FIG. 9.

In general, a single component with an attention weight above the threshold attention weight for the supra-image, when present in the supra-image, is sufficient for a positive classification of the supra-image by the classifier. If all components with attention weights greater than the threshold attention weight are removed from a positively classified supra-image, the classifier will classify the resulting scrubbed supra-image as negative. Method 500 determines the threshold attention weight for a particular positively classified supra-image. Method 500 may be used to determine threshold attention weights for each of a plurality of positively classified supra-images by repeated application.

Method 500 may determine a threshold attention weight for a positively classified supra-image using a search strategy. The naïve approach, where the subset of components sufficient for positive classification is established by individually passing each component of a supra-image through the model, is prohibitively inefficient for practical applications, as there are a large number of components in each supra-image, and typically a very small number of those are responsible for the model's positive prediction. Instead, some embodiments utilize a binary search technique to detect this subset of components sufficient for positive classification by utilizing the attention weights themselves to choose trial subsets to pass through the model and obtain a prediction on each subset. For a supra-image with model prediction D, the goal of passing these trial subsets through the model is to find an attention threshold index t for a set of components l sorted by their attention weights $[w_0 \ldots w_n]$ with $w_0$ being the lowest and $w_n$ being the highest such that:
(1) Predicting on the subset of components with the lowest attention $[i_0, \ldots, i_{t-1}]$ results in a different prediction $D' \neq D$, and
(2) Predicting on the subset $[l_0 \ldots l_t]$ results in the same prediction D as would result from predicting on the entire set. (And, predicting individually on any single tile in the set $[l_t \ldots l_n]$ will also give the original prediction D.)

Some embodiments find this critical attention weight threshold $w_t$ by using the model to predict on subsets of images until it identifies the index for the minimal attention weight index t at which the model's decision D matches the prediction the network would make on the entire supra-image, or when maximally-attended components of the supra-image are included in prediction. It is computationally inefficient to feed all possible trial subsets of components within a supra-image through the model to find t, so some embodiments improve the efficiency of this process by logarithmically reducing the number of components in a trial subset for every iteration, following a binary search strategy to efficiently find t.

At 502, method 500 obtains a supra-image. The supra-image may have a prediction D by a neural network with an attention layer, and the prediction D may be a positive prediction for a property. The property may be a property of interest, a spuriously correlated property, a confounding property, or a different property. For notational purposes, the supra-image obtained at 502 may have n components (e.g., tiles or feature vectors of its one or more constituent images). That is, the supra-image may have a total of n components from among its constituent image(s); such components of a supra-image may be referred to as "supra-image components".

At 504, method 500 sorts the set of n components by their attention weights, where the sorted list is denoted $[l_0 \ldots l_n]$. Actions 506, 508, 510, and 512 iteratively divide the set of components in half to narrow down the components contributing to the model's positive prediction. The iteration may repeatedly pare down a set of components referred to as an "active" set of components A to determine the threshold attention weight. At the first step in the iteration, the active sequence of components may be set equal to the full set of components $[l_0 \ldots l_n]$. The iteration may continue until the active sequence of components A may no longer be divided in half and all components have been labeled as either positive (corresponding to critical areas for the prediction D) or negative.

Thus, at 506, method 500 splits the active sequence of components A in half. If the active sequence of components is odd, it may be split into two sets that are not equal in size in any manner, e.g., by splitting in half and assigning the "middle" component to either half. Denote the half with the lower attention weights as $A_l$, and denote the half with higher attention weights as $A_h$.

At 508, method 500 passes the components in the lower half $A_l$ through the neural network to obtain a classification. The classification may be positive (e.g., D) or negative (e.g., D').

At 510, method 500 resets the active sequence of components according to the classification obtained at 508. If, on the one hand, the classification is not equal to D, then label all components in $A_l$ as negative and discard them from the search, and set the active components to the upper half, $A=A_h$. If, on the other hand, the classification is equal to D, then label all components in $A_h$ as positive and discard them from the search, and set the active components to the lower half, $A=A_l$.

At 512, method 500 determines whether to stop. In general, method 500 may stop once the active sequence of components A may no longer be divided in two (e.g., it is a singleton). In that case, the threshold is equal to the index t of first component in $A_h$, corresponding to the tile or component with the lowest attention weight that can be labelled as a positive for corresponding to the prediction D. Such an attention weight, denoted $w_t$, may be provided as the threshold attention weight for the supra-image obtained at 502.

At 514, method 500 provides the threshold attention weight. The threshold attention weight may be provided an any of a variety of manners. According to some embodiments, the threshold attention weight is provided by being displayed on a computer monitor. According to some embodiments, the threshold attention weight is provided by being stored in electronic persistent memory in association with an identification of its associated supra-image, image(s), or component(s) thereof. According to some embodiments, the threshold attention weight is provided to a computer process, either directly or with prior storage in memory, such as is shown and described herein in reference to method 700.

Method 500 may be repeated for a plurality of supra-images, e.g., a training corpus of supra-images, in order to assign each supra-image a threshold attention weight. For various applications of method 500, each component in such a supra-image may be associated with the threshold attention weight associated with the supra-image.

Figure 6:
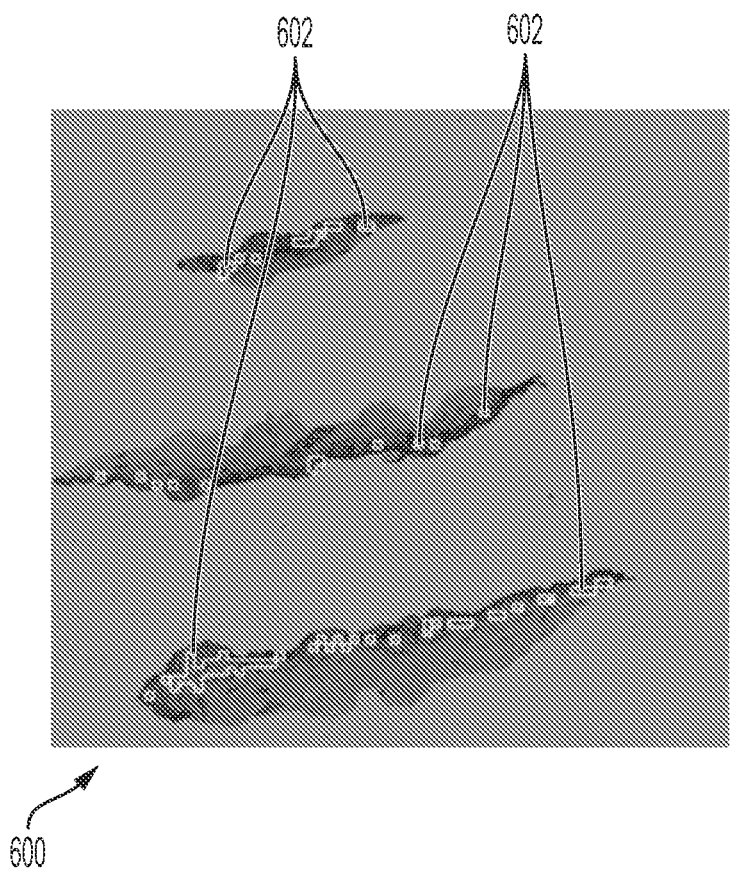
FIG. 6 depicts an example whole-slide image portion with critical components identified by an example embodiment.

FIG. 6 depicts an example whole-slide image portion 600 with critical components identified by an example embodiment. As shown in FIG. 6, image 600 is a portion of a whole-slide image and depicts three slices from a biopsy. The supra-image that includes image 600 was classified as positive for cancer by a neural network that included an attention layer. Further, image 600 is parsed into tiles, and the tiles, e.g., tiles 602, that have attention weights over the threshold attention weight for the supra-image that includes image 600 are sufficient on their own for a positive classification by the neural network. If the tiles having attention weights greater than the threshold attention weight, including tiles 602, are removed from the image, it will no longer have a positive classification by the neural network.

Figure 7:
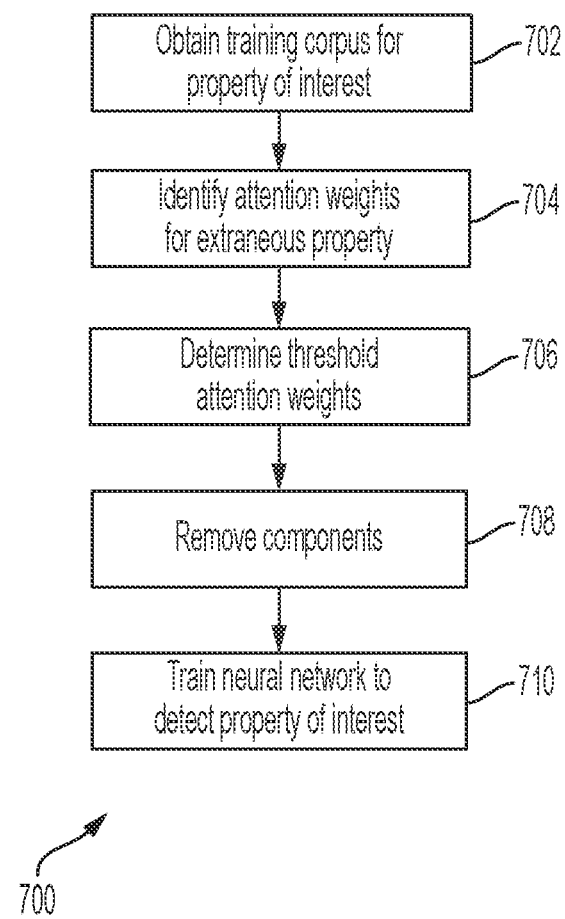
FIG. 7 is a flow diagram for a method of training an electronic neural network classifier to identify a presence of a particular property in a novel supra-image while ignoring a spurious correlation of the presence of the particular property with a presence of an extraneous property.

FIG. 7 is a flow diagram for a method 700 of training an electronic neural network classifier to identify a presence of a particular property in a novel supra-image while ignoring a spurious correlation of the presence of the particular property with a presence of an extraneous property. The particular property may be, by way of non-limiting example, a presence of a pathology such as a malignancy. The extraneous confounding property may be, by way of non-limiting example, a presence of ink markings.

Method 700 may involve two classifiers, referred to herein as a property if interest classifier and an extraneous property classifier. The property of interest classifier may be any classifier, such as by way of non-limiting example, a neural network, that can be trained to discriminate for the presence of the particular property, e.g., a property of interest. The extraneous property classifier can be any neural network or other classifier that includes an attention layer, e.g., neural network 200 as shown and described above in reference to FIG. 2, trained to discriminate for the presence of the extraneous property, which may be a confounding property that is spuriously correlated with the particular property. Method 700 may utilize a training technique, such as method 300 as shown and described herein in reference to FIG. 3. Method 700 may determine a threshold attention weight for one or more supra-images, e.g., using method 500 as shown and described herein in reference to FIG. 5. Method 700 may be implemented by system 900, as shown and described herein in reference to FIG. 9.

At 702, method 700 obtains a training corpus of supra-images for training a first neural network to discriminate for the presence of the property of interest. The supra-images may be weakly labeled, e.g., based on electronic clinical records, such as are stored in an LIS. The training corpus may be obtained using any of a variety of techniques, such as retrieval over a computer network or retrieval from electronic persistent storage.

At 704, method 700 identifies, for the extraneous property and using the extraneous property classifier, a respective attention weight for each component of each image of each supra-image in the training corpus obtained at 702. Method 700 may pass the components through the extraneous property classifier to do so. For example, method 700 may pass the components through the extraneous property classifier as part of one or more applications of method 500, e.g., during 706; that is, the actions of 704 may be combined with the actions of 706. The attention weights may be stored in volatile or persistent memory for usage later on in method 700.

At 706, method 700 identifies, for the extraneous property and using the extraneous property classifier, a respective threshold attention weight for each supra-image in the training corpus obtained at 702. Method 700 may implement method 500 repeatedly to do so. The threshold attention weights may be stored in volatile or persistent memory for usage later on in method 700.

At 708, method 700 removes from each supra-image of the training corpus the components that have attention weights above the threshold attention weight for the respective supra-image. Method 700 may do so using a variety of techniques. For example, the components that have attention weights above their respective threshold attention weights may be masked, covered, or deleted from the supra-images in the training corpus. For example, such components may be marked for omission from being passed to the neural network during training. The process of 708 produces a scrubbed training corpus, which does not include a detectable presence of the extraneous property.

At 710, method 700 trains the particular property classifier using the scrubbed training corpus produced by 708. Method 700 may use method 300, as shown and described herein in reference to FIG. 3, to do so. The resulting trained particular property classifier is capable of discriminating for the presence of the property of interest, without erroneously classifying supra-images that include the extraneous property as positive, even though the extraneous property may be spuriously correlated with a positive classification for the property of interest in the original training corpus.

For example, method 700 can be used to detect pen ink marks in digitized whole-slide images (or supra-images) in a weakly supervised fashion. To accomplish this, some embodiments train an attention-based multiple instance learning model using tiles as components, with the labels for training given at the slide level, indicating whether or not a slide contains a region inked by pen. Once the model is trained, it can identify the slides (or supra-images) predicted positive for pen ink. Such embodiments then isolate positive components containing pen ink in these slides and exclude them from analyses, training, or prediction.

Figure 8:
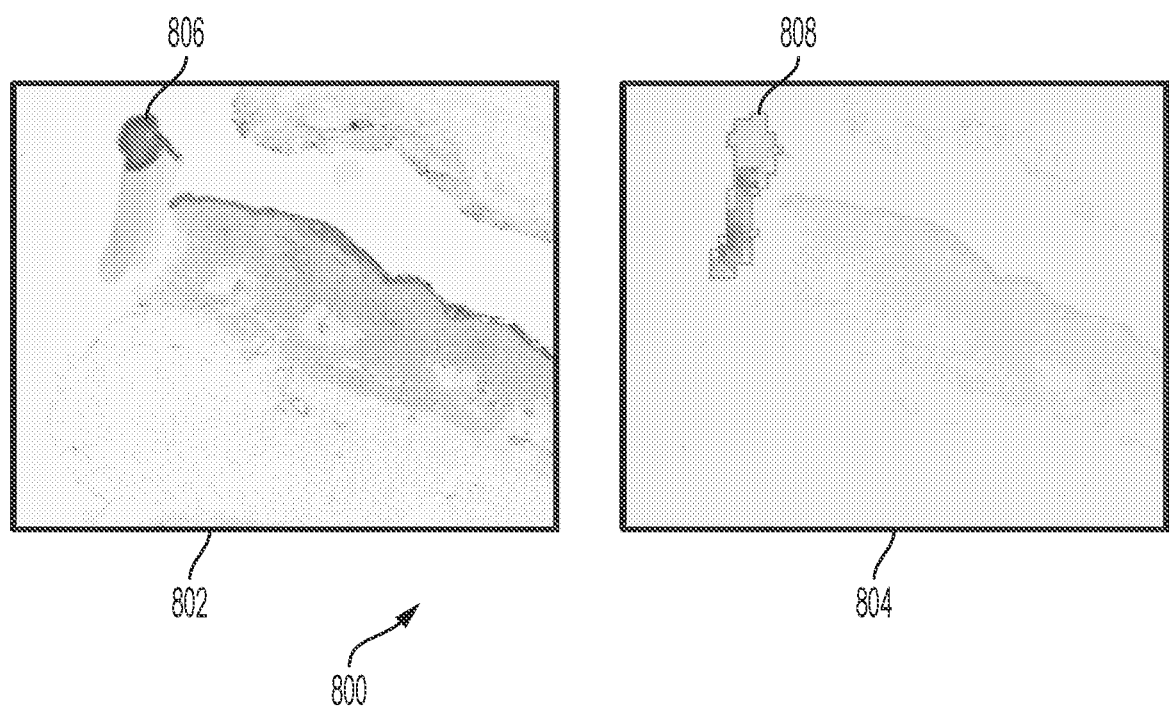
FIG. 8 depicts an example pathology image with a pen mark and the example pathology image with a pen mark identification produced by an example reduction to practice.

FIG. 8 depicts shows depictions 800 of an example pathology image 802 with a pen mark 806 and the example pathology image 804 with a pen mark identification 808 produced by an example reduction to practice. Image 802 is a dermatopathology slide containing residual melanoma in situ, with pen ink present, indicating the presence of the tumor. Image 804 shows attention values, represented as relative transparency, from the ink detection model for each tile overlaid on the original whole-slide image. Lighter shaded regions have lower attention weight values, whereas darker shading indicates high attention weight values. The identified region was outlined by the second example reduction to practice described in Section V, below. In particular, the outlined squares and right polygons overlaid on the whole-slide image identify the components that were labeled as positive (relevant to the prediction) using binary search attention thresholding as described herein in reference to method 500. Note that images 802 and 804 include thousands of components, only a small number of which are positive. The inked region is completely isolated in image 804. Removing the outlined tiles from the whole-slide image allows it to be used for downstream weakly supervised models without risk of ink producing biased, false signals of malignancy.

Figure 9:
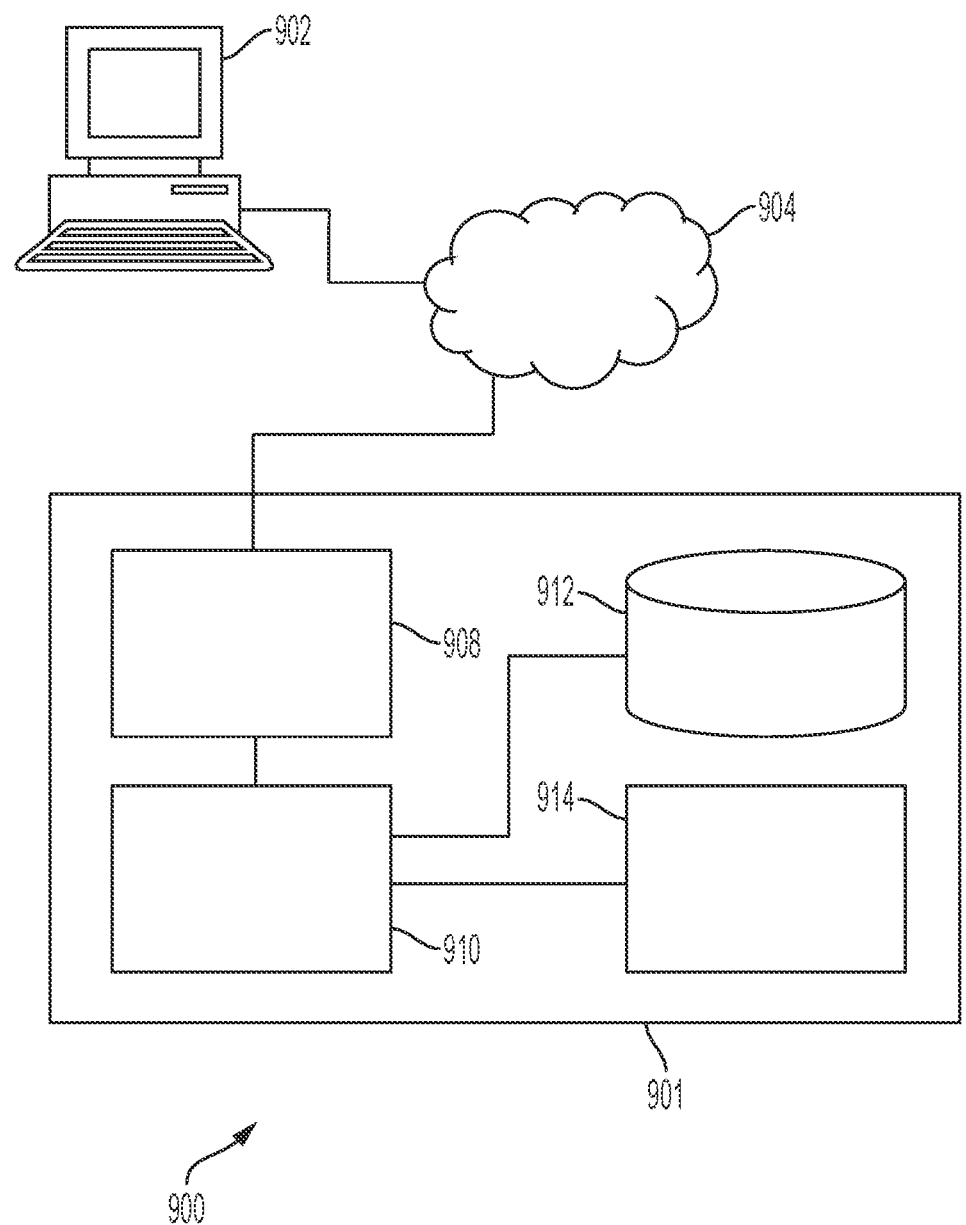
FIG. 9 is a schematic diagram of a hardware computer system suitable for implementing various embodiments.

FIG. 9 is a schematic diagram of a hardware computer system 900 suitable for implementing various embodiments. For example, FIG. 9 illustrates various hardware, software, and other resources that can be used in implementations of any of methods 300, 400, 500, or 700 and/or one or more instances of a neural network, such as neural network 200. System 900 includes training corpus source 902 and computer 901. Training corpus source 902 and computer 901 may be communicatively coupled by way of one or more networks 904, e.g., the internet.

Training corpus source 902 may include an electronic clinical records system, such as an LIS, a database, a compendium of clinical data, or any other source of supra-images suitable for use as a training corpus as disclosed herein.

Computer 901 may be implemented as any of a desktop computer, a laptop computer, can be incorporated in one or more servers, clusters, or other computers or hardware resources, or can be implemented using cloud-based resources. Computer 901 includes volatile memory 914 and persistent memory 912, the latter of which can store computer-readable instructions, that, when executed by electronic processor 910, configure computer 901 to perform any of methods 300, 400, 500, and/or 700, and/or form or store any neural network, such as neural network 200, and/or perform any classification technique, such as hierarchical classification technique 1100, as shown and described herein. Computer 901 further includes network interface 908, which communicatively couples computer 901 to training corpus source 902 via network 904. Other configurations of system 900, associated network connections, and other hardware, software, and service resources are possible.

III. First Example Reduction to Practice

This Section presents a first example reduction to practice. The first example reduction to practice was configured to perform hierarchical classification of digitized whole-slide image specimens into six classes defined by their morphological characteristics, including classification of "Melanocytic Suspect" specimens likely representing melanoma or severe dysplastic nevi. The reduction to practice was trained on 7,685 images from a single lab (the reference lab), including the largest set of triple-concordant melanocytic specimens compiled to date, and tested the system on 5,099 images from two distinct validation labs. The reduction to practice achieved Area Underneath the Receiver Operating Characteristics Curve (AUC) values of 0.93 classifying Melanocytic Suspect specimens on the reference lab, 0.95 on the first validation lab, and 0.82 on the second validation lab. The reduction to practice is capable of automatically sorting and triaging skin specimens with high sensitivity to Melanocytic Suspect cases and demonstrates that a pathologist would only need between 30% and 60% of the caseload to address all melanoma specimens.

A. Introduction to the Reduction to Practice

More than five million diagnoses of skin cancer are made each year in the United States, about 106,000 of which are melanoma of the skin. Diagnosis requires microscopic examination H&E stained, paraffin wax embedded biopsies of skin lesion specimens on glass slides. These slides can be manually observed under a microscope, or digitally on a whole-slide image scanned on specialty hardware.

The five-year survival rate of patients with metastatic malignant melanoma is less than 20%. Melanoma occurs more rarely than several other types of skin cancer, and its diagnosis is challenging, as evidenced by a high discordance rate among pathologists when distinguishing between melanoma and benign melanocytic lesions (~40% discordance rate). The Melanocytic Pathology Assessment Tool and Hierarchy for Diagnosis (MPATH-Dx; "MPATH" hereafter) reporting schema was introduced by Piepkorn, et al., *The mpath-dx reporting schema for melanocytic proliferations and melanoma*, Journal of the American Academy of Dermatology, 70(1):131-141, 2014 to provide a precise and consistent framework for dermatopathologists to grade the severity of melanocytic proliferation in a specimen. MPATH scores are enumerated from I to V, with I denoting a benign melanocytic lesion and V denoting invasive melanoma. It has been shown that discordance rates are related to the MPATH score, with better inter-observer agreement on both ends of the scale than in the middle.

A tool that allows labs to sort and prioritize melanoma cases in advance of pathologist review could improve turn-around time, allowing pathologists to review cases requiring faster turnaround time early in the day. This is particularly important as shorter turnaround time is correlated with improved overall survival for melanoma patients. It could also alleviate common lab bottlenecks such as referring cases to specialized dermatopathologists, or ordering additional tissue staining beyond the standard H&E. These contributions are especially important as the number of skin biopsies performed per year has skyrocketed, while the number of practicing pathologists has declined.

The advent of digital pathology has brought the revolution in machine learning and artificial intelligence to bear on a variety of tasks common to pathology labs. Several deep learning algorithms have been introduced to distinguish between different skin cancers and healthy tissue with very high accuracy. See, e.g., De Logu, et al., *Recognition of cutaneous melanoma on digitized histopathological slides via artificial intelligence algorithm*, Frontiers in Oncology, 10, 2020; Thomas, et al., Interpretable deep learning systems for multi-class segmentation and classification of nonmelanoma skin cancer, Medical Image Analysis, 68:101915, 2021; Zormpas-Petridis, et al., *Superhistopath: A deep learning pipeline for mapping tumor heterogeneity on low-resolution whole-slide digital histopathology images*, Frontiers in Oncology, 10:3052, 2021; and Geijs, et al., *End-to-end classification on basal-cell carcinoma histopathology whole-slides images*, Society of Photo-Optical Instrumentation Engineers (SPIE) Conference Series, February 2021. However, almost all of these studies fail to demonstrate the robustness required for use in a clinical workflow setting because they were tested a on small number (<~1000) of whole-slide images. Moreover, these algorithms are often not capable of triaging whole-slide images, as they use curated training and test datasets that do not represent the diversity of cases encountered in a dermatopathology lab. Many of them rely on pixel-level annotations to train their models, which is slow and expensive to scale to a large dataset with greater variability.

Considerable advancements have been made towards systems capable of use in clinical practice for prostate cancer. In Campanella, et al., *Clinical-grade computational pathology using weakly supervised deep learning on whole-slide images*, Nature Medicine, 25(8):1301-1309, 2019, the authors trained a model in a weakly-supervised framework that did not require pixel-level annotations to classify prostate cancer and validated on ~10,000 whole-slide images sourced from multiple countries. However, some degree of human-in-the-loop curation was performed on their dataset, including manual quality control such as post-hoc removal of slides with pen ink from the study. Pantanowitz, et al, *An artificial intelligence algorithm for prostate cancer diagnosis in whole-slide images of core needle biopsies: a blinded clinical validation and deployment study*, The Lancet Digital Health, 2(8):e407-e416, 2020 describes using pixel-wise annotations to develop a model trained on ~550 whole-slide images that distinguish high-grade from low-grade prostate cancer. In dermatopathology, the model developed in Ianni, et al., *Tailored for real-world: A whole-slide image classification system validated on uncurated multi-site data emulating the prospective pathology workload*, Nature Scientific Reports, 10(1):1-12, 2020, hereinafter, "Ianni 2020", classified skin lesion specimens between four morphology-based groups, was tested on ~13,500 whole-slide images, and also demonstrated that use of confidence thresholding could provide a high accuracy; however, it grouped malignant melanoma with all other benign melanocytic lesions, limiting its potential uses. Additionally, all previous attempts at pathology classification using deep learning have, at their greatest level of abstraction, performed classification at the level of a whole-slide image or a sub-region of a whole-slide image. Because a pathologist is required to review all whole-slide images from a tissue specimen, previous deep learning pathology efforts therefore do not leverage the same visual information that a pathologist would have at hand to perform a diagnosis, require some curation of datasets to ensure that pathology is present in all training slides, and implement ad-hoc rules for combining the predictions of each whole-slide corresponding to a specimen. Most have also neglected the effect of diagnostic discordance on their ground truth, resulting in potentially mislabeled training and testing data.

Thus, this Section presents a reduction to practice that can classify skin cases for triage and prioritization prior to pathologist review. Unlike previous systems, the reduction to practice performs hierarchical melanocytic specimen classification into low (MPATH I-II), Intermediate (MPATH III), or High (MPATH IV-V) diagnostic categories, allowing for prioritization of melanoma cases. The reduction to practice was the first to classify skin biopsies at the specimen level through a collection of whole-slide images that represent the entirety of the tissue from a single specimen, e.g., a supra-image. This training procedure is analogous to the process of a dermatopathologist, who reviews the full collection of scanned whole-slide images corresponding to a specimen to make a diagnosis. Finally, the reduction to practice was trained and validated on the largest dataset of consensus-reviewed melanocytic specimens published to date. The reduction to practice was built to be scalable and ready for the real-world, built without any pixel-level annotations, and incorporating the automatic removal of scanning artifacts.

B. Reference and Validation Lab Data Collection

The reduction to practice was trained using slides from 3511 specimens (consisting of 7685 whole-slide images) collected from a leading dermatopathology lab in a top academic medical center (Department of Dermatology at University of Florida College of Medicine), which is referred to as the "Reference Lab". The Reference Lab dataset consisted of both an uninterrupted series of sequentially-accessioned cases (69% of total specimens) and a targeted set, curated to enrich for rarer melanocytic pathologies (31% of total specimens). Melanocytic specimens were only included in this set if three dermatopathologists' consensus on diagnosis could be established. The whole-slide images consisted exclusively of H&E-stained, formalin-fixed, paraffin-embedded dermatopathology tissue and were scanned using a 3DHistech P250 High Capacity Slide Scanner at an objective power of 20×, corresponding to 0.24 µm/pixel. The final classification given by the reduction to practice was one of six classes, defined by their morphologic characteristics:

1. Basaloid: containing abnormal proliferations of basaloid-oval cells, primarily basal cell carcinoma of various types;
2. Squamous: containing malignant squamoid epithelial proliferations, consisting primarily of squamous cell carcinoma (invasive and in situ);
3. Melanocytic Low Risk: benign to moderately atypical melanocytic nevi/proliferation of cells of melanocytic origin, classified as the MPATH I or MPATH II diagnostic category;
4. Melanocytic Intermediate Risk: severely atypical melanocytic nevi or melanoma in situ, classified as the MPATH III diagnostic category;
5. Melanocytic High Risk: invasive melanoma, classified as the MPATH IV or V diagnostic category; or
6. Other: all skin specimens that do not fit into the above classes, including but not limited to inflammatory conditions and benign proliferations of squamoid epithelial cells.

The overall reference set was composed of 544 Basaloid, 530 Squamous, 1079 Melanocytic and 1358 Other specimens. Of the Melanocytic specimens, 764 were Low Risk, 213 were Intermediate Risk and 102 were High Risk. The heterogeneity of this reference set is illustrated in Table 1, below.

TABLE 1

Counts of each of the general pathologies in the reference set from the Reference Lab, broken-out into specific diagnostic entities

| Diagnostic Morphology | Counts |
|---|---|
| Basaloid | 544 |
| Nodular Basal Cell Carcinoma | 404 |
| Basal Cell Carcinoma, NOS | 123 |
| Basal Cell Carcinoma, Morphea type | 7 |
| Pilomatrixoma | 5 |
| Infiltrative Basal Cell Carcinoma | 5 |
| Squamous | 530 |
| Invasive Squamous Cell Carcinoma | 269 |
| Squamous Cell Carcinoma in situ (Bowen's Disease) | 254 |
| Fibrokeratoma | 4 |
| Warty Dyskeratorma | 3 |

TABLE 1-continued

Counts of each of the general pathologies in the reference set from the Reference Lab, broken-out into specific diagnostic entities

| Diagnostic Morphology | Counts |
|---|---|
| Melanocytic High Risk | 102 |
| Melanoma | 102 |
| Melanocytic Intermediate Risk | 213 |
| Melanoma In Situ | 202 |
| Severe Dysplasia | 9 |
| Melanocytic Low Risk | 764 |
| Conventional Melanocytic Nevus (acquired and congenital) | 368 |
| Mild Dysplasia | 289 |
| Moderate Dysplasia | 75 |
| Halo Nevus | 14 |
| Dysplastic Nevus, NOS | 12 |
| Spitz Nevus | 2 |
| Blue Nevus | 2 |
| Other Diagnoses | 1360 |

The specimen counts presented herein for the melanocytic classes reflect counts following three-way consensus review (see Section IV(C)). For training, validating, and testing the reduction to practice, this dataset was divided into three partitions by sampling at random without replacement with 70% of specimens used for training, and 15% used for each of validation and testing.

To validate performance and generalizability across labs, scanners, and associated histopathology protocols, several large datasets of similar composition to the Reference Lab were collected from leading dermatopathology labs of two additional top academic medical centers (Jefferson Dermatopathology Center, Department of Dermatology Cutaneous Biology, Thomas Jefferson University, denoted as "Validation Lab 1", and Department of Pathology and Laboratory Medicine at Cedars-Sinai Medical Center, which is denoted as "Validation Lab 2"). These datasets are both comprised of: (1) an uninterrupted set of sequentially-accessioned cases—65% for Validation Lab 1, 24% for Validation Lab, and (2) a set targeted to heavily sample melanoma, pathologic entities that mimic melanoma, and other rare melanocytic specimens. Specimens from Validation Lab 1 consisted of slides from 2795 specimens (3033 whole-slide images), scanned using a 3DHistech P250 High Capacity Slide Scanner at an objective power of 20× (0.24 µm/pixel). Specimens from Validation Lab 2 consisted of slides from 2066 specimens (2066 whole-slide images; each specimen represented by a single whole-slide image), with whole-slide images scanned using a Ventana DP 200 scanner at an objective power of 20× (0.47 µm/pixel). Note: specimen and whole-slide image counts above reflect specimens included in the study after screening melanocytic specimens for inter-pathologist consensus. Table 2 shows the class distribution for the Validation labs.

TABLE 2

Class counts for the Validation Lab datasets

| Label Category | Validation Lab 1 | Validation Lab 2 |
|---|---|---|
| MPATH I-II | 1457 | 458 |
| MPATH III | 225 | 361 |
| MPATH IV-V | 100 | 361 |
| Basaloid | 198 | 265 |
| Squamous | 104 | 55 |
| Other | 711 | 563 |

C. Consensus Review

There are high discordance rates in diagnosing melanocytic specimens. Elmore et al. [4] studied 240 dermatopathology cases and found that the consensus rate for MPATH Class II lesions was 25%, for MPATH Class III lesions 40%, and for MPATH Class IV 45%. Therefore, three board-certified pathologists reviewed each melanocytic specimen to establish a reliable ground truth for melanocytic cases in the implementation of the reduction to practice described herein. The first review was the original specimen diagnosis made via glass slide examination under a microscope. Two additional dermatopathologists independently reviewed and rendered a diagnosis digitally for each melanocytic specimen. The patient's year of birth and gender were provided with each specimen upon review. Melanocytic specimens were considered to have a consensus diagnosis and included in the study if:

1. All three dermatopathologists were in consensus on a diagnostic class for the specimen, or
2. Two of three dermatopathologists were in consensus on a diagnostic class for the specimen, and a fourth and fifth pathologist reviewed the specimen digitally and both agreed with the majority classification.

A diagnosis was rendered in the above fashion for every melanocytic specimen obtained from the Reference Lab and Validation Lab 1. All dysplastic and malignant melanocytic specimens from Validation Lab 2 were reviewed by three dermatopathologists, and only the specimens for which consensus could be established were included in the study. No non-melanocytic specimens were reviewed for concordance due to inherently lower known rates of discordance.

For the specimens obtained from the Reference Lab, consensus was established for 75% of specimens originally diagnosed as MPATH I/II, 66% of those diagnosed as MPATH III, 87% of those diagnosed as MPATH IV/V, and for 74% of the reviewed specimens in total. For specimens obtained from Validation Lab 1, pathologists consensus was established for 84% of specimens originally diagnosed as MPATH I/II specimens, 51% of those diagnosed as MPATH III, 54% of those diagnosed as MPATH IV/V, and for 61% of the reviewed specimens in total.

D. Reduction to Practice System Architecture

Figure 10:
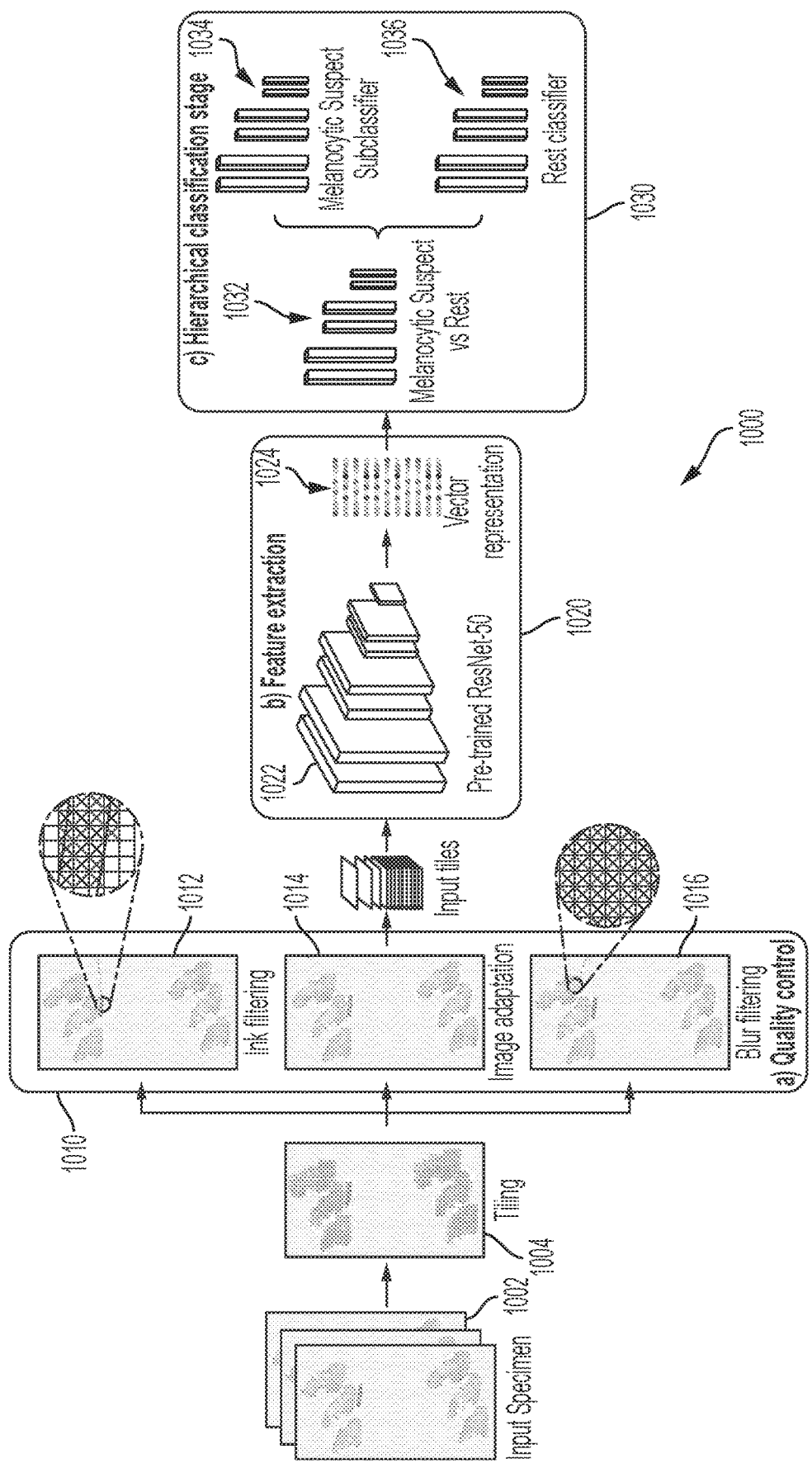
FIG. 10 is a schematic diagram of the system architecture of an example reduction to practice.

FIG. 10 is a schematic diagram of the system architecture 1000 of an example reduction to practice. The reduction to practice includes three main components: quality control 1010, feature extraction 1020, and hierarchical classification 1030. A brief description of how the reduction to practice was used to classify a novel supra-image follows. Each specimen 1002, a supra-image, was first segmented into tissue-containing regions, subdivided into 128×128 pixel tiles by tiling 1004, and extracted at an objective power of 10×. Each tile was passed through the quality control 1010, which includes ink filtering 1012, blur filtering 1016, and image adaptation 1014. Ink filtering 1012 implemented at least a portion of an embodiment of method 700. The image-adapted tiles were then passed through the feature extraction 1020 stage, including a pretrained ResNet50 network 1022, to obtain embedded vectors 1024 as components corresponding to the tiles. Next, the embedded vectors 1024 were propagated through the hierarchical classification 1030 stage, including an upstream neural network 1032 performing a binary classification between "Melanocytic Suspect" and "Rest". Specimens that were classified as "Melanocytic Suspect" were fed into a first downstream neural network 1034, which classified between "Melanocytic High Risk, Melanocytic Intermediate Risk" and "Rest". The remaining specimens were fed into a second downstream "Rest" neural network 1036, which classified between "Basaloid, Squamous, Melanocytic Low Risk" and "Other". This classification process of the reduction to practice is described in detail presently.

Quality control 1010 included ink filtering 1012, blur filtering 1016, and image adaptation 1014. Pen ink is common in labs migrating their workload from glass slides to whole-slide images where the location of possible malignancy was marked. This pen ink represented a biased distractor signal in training the reduction to practice that is highly correlated with malignant or High Risk pathologies. Tiles containing pen ink were identified by a weakly supervised neural network trained to detect inked slides. These tiles were removed from the training and validation data and before inference on the test set. Areas of the image that were out of focus due to scanning errors were also removed to the extent possible by blur filtering 1016 by setting a threshold on the variance of the Laplacian over each tile. In order to avoid domain shift between the colors of the training data and validation data, the reduction to practice adopted as its image adaptation 1014 the image adaptation procedure in Ianni 2020.

The next component of the reduction to practice, feature extraction 1020, extracted informative features from the quality controlled, color-standardized tiles. To capture higher-level features in these tiles, they were propagated through a neural network (ResNet50; He, et al., *Deep residual learning for image recognition*, arXiv preprint arXiv:1512.03385, 2015) trained on the ImageNet (Deng, et al., *Imagenet: A large-scale hierarchical image database*, In IEEE Conference on Computer Vision and Pattern Recognition, pages 248-255, 2009) dataset to embed each input tile into 1024 channel vectors which were then used in subsequent neural networks.

The hierarchical neural network architecture was developed in order to classify both Melanocytic High and Intermediate Risk specimens with high sensitivity. First, the upstream neural network 1032 performed a binary classification between "Melanocytic Suspect" (defined as "High or Intermediate Risk") and "Basaloid, Squamous, Low Risk", or "Other" (which are collectively defined as the "Rest" class). Specimens that were classified as "Melanocytic Suspect" were fed into the downstream neural network 1034, which further classified the specimen between "Melanocytic High Risk, Melanocytic Intermediate Risk" and "Rest". The remaining specimens, classified as "Rest", were fed into a separate downstream neural network 1036, which further classified the specimen between "Basaloid, Squamous, Melanocytic Low Risk" and "Other". Each neural network 1032, 1034, 1036 included four fully-connected layers (two layers of 1024 channels each, followed by two of 512 channels each). Each neuron in the three layers after the input layer was ReLU activated.

The three neural networks 1032, 1034, 1036 in the hierarchy were trained under a weakly-supervised multiple-instance learning (MIL) paradigm. Each embedded tile was treated as an instance of a bag containing all quality-assured tiles of a specimen. Embedded tiles were aggregated using sigmoid-activated attention heads. To help prevent overfitting, the training dataset included augmented versions of the tiles. Augmentations were generated with the following augmentation strategies: random variations in brightness, hue, contrast, saturation, (up to a maximum of 15%), Gaussian noise with 0.001 variance, and random 90° image rotations. The upstream binary "Melanocytic Suspect vs. Rest" classification neural network 1032 and the downstream "Rest" subclassifier neural network 1036 were each trained end-to-end with cross-entropy loss. The "Melanocytic Suspect" subclassifier neural network 1034 was also trained with cross-entropy loss, but with a multi-task learning strategy. This subclassifier neural network 1034 was presented with three tasks: differentiating "Melanocytic High Risk" from "Melanocytic Intermediate Risk" specimens, "Melanocytic High Risk" from "Rest" specimens, and "Melanocytic Intermediate Risk" from "Rest" specimens. The training loss for this subclassifier neural network 1034 was computed for each task, but was masked if it did not relate to the ground truth label of the specimen. Two out of three tasks were trained for any given specimen in a training batch. By training in this manner, the shared network layers were used as a generic representation of melanocytic pathologies, while the task branches learned to attend to specific differences to accomplish their tasks.

Figure 11:
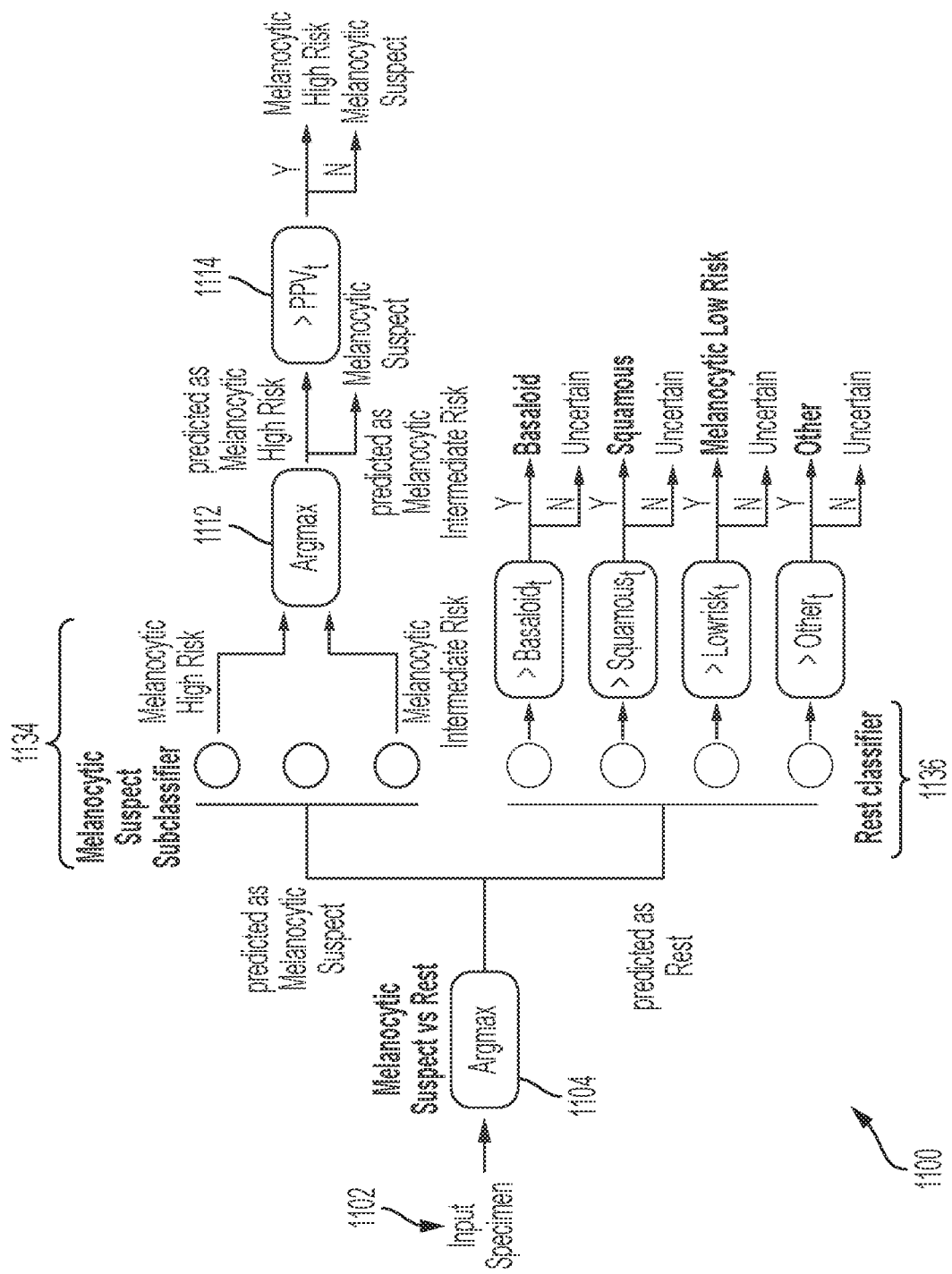
FIG. 11 is a schematic diagram representing a hierarchical classification technique implemented by the reduction to practice of FIG. 6.

FIG. 11 is a schematic diagram representing a hierarchical classification technique 1100 implemented by the reduction to practice of FIG. 10. For example, the hierarchal classification technique 1100 may be implemented by hierarchal classification 1030 as shown and described above in reference to FIG. 10. Thus, FIG. 11 depicts Melanocytic Suspect Subclassifier 1134, corresponding to the first downstream neural network 1034 of FIG. 10, and depicts Rest subclassifier 1136, corresponding to the second downstream neural network 1036 of FIG. 10. During inference, the predicted classes of an input specimen 1102 (e.g., a supra-image) were computed as follows:

1. The larger of the two confidence values 1104 (see below for the confidence thresholding procedure) output from the upstream classifier determined which downstream classifier a specimen was passed to.
2. If the specimen was handed to the "Rest" subclassifier 1136, used the highest confidence class probability was used as the predicted label.
3. If the specimen was handed to the Melanocytic Suspect subclassifier 1134, the highest confidence class probability between the "Melanocytic High Risk vs Rest" and "Melanocytic Intermediate Risk vs Rest" tasks was used as the predicted label.

As an additional step in the classification pipeline, the hierarchical classification technique 1100 performed classification with uncertainty quantification to establish a confidence score for each prediction using a Monte Carlo dropout method following a similar procedure as used by Gal et al., *Dropout as a Bayesian approximation: Representing model uncertainty in deep learning*, In International Conference on Machine Learning, pages 1050-1059, 2016. Using the confidence distribution of the specimens in the validation set of the Reference Lab, the hierarchal classification technique 1100 computed confidence threshold values for each predicted class following the procedure outlined in Ianni 2020 by requiring classifications to meet a predefined a level of accuracy in the validation set. Specimens that were predicted as "Melanocytic High Risk" had to pass two confidence thresholds: an accuracy threshold 1112 and a PPV threshold 1114—both established a priori on the validation set to be predicted as "Melanocytic High Risk—in order to be predicted as "Melanocytic High Risk". Specimens that were predicted to be "Melanocytic High Risk" but failed to meet these thresholds were predicted as "Melanocytic Suspect". Thresholds that maximized the sensitivity of the reduction to practice to the "Melanocytic Suspect" class were set, while simultaneously maximizing the PPV to the "Melanocytic High Risk" class.

To evaluate how the reduction to practice generalizes to data from other labs, the neural network trained on data from the Reference Lab to both Validation Lab 1 and Validation Lab 2 was fine tuned. A quantity of 255 specimens were set aside from each validation lab (using an equal class distribution of specimens) as the calibration set, of which 210 specimens were used as the training set, and 45 specimens were used as the validation set for fine tuning the neural networks. (The remaining specimens in the validation lab used as the test set.) The final validation lab metrics presented below are reported on the test set with these calibrated neural networks.

E. Performance Evaluation

Figure 12:
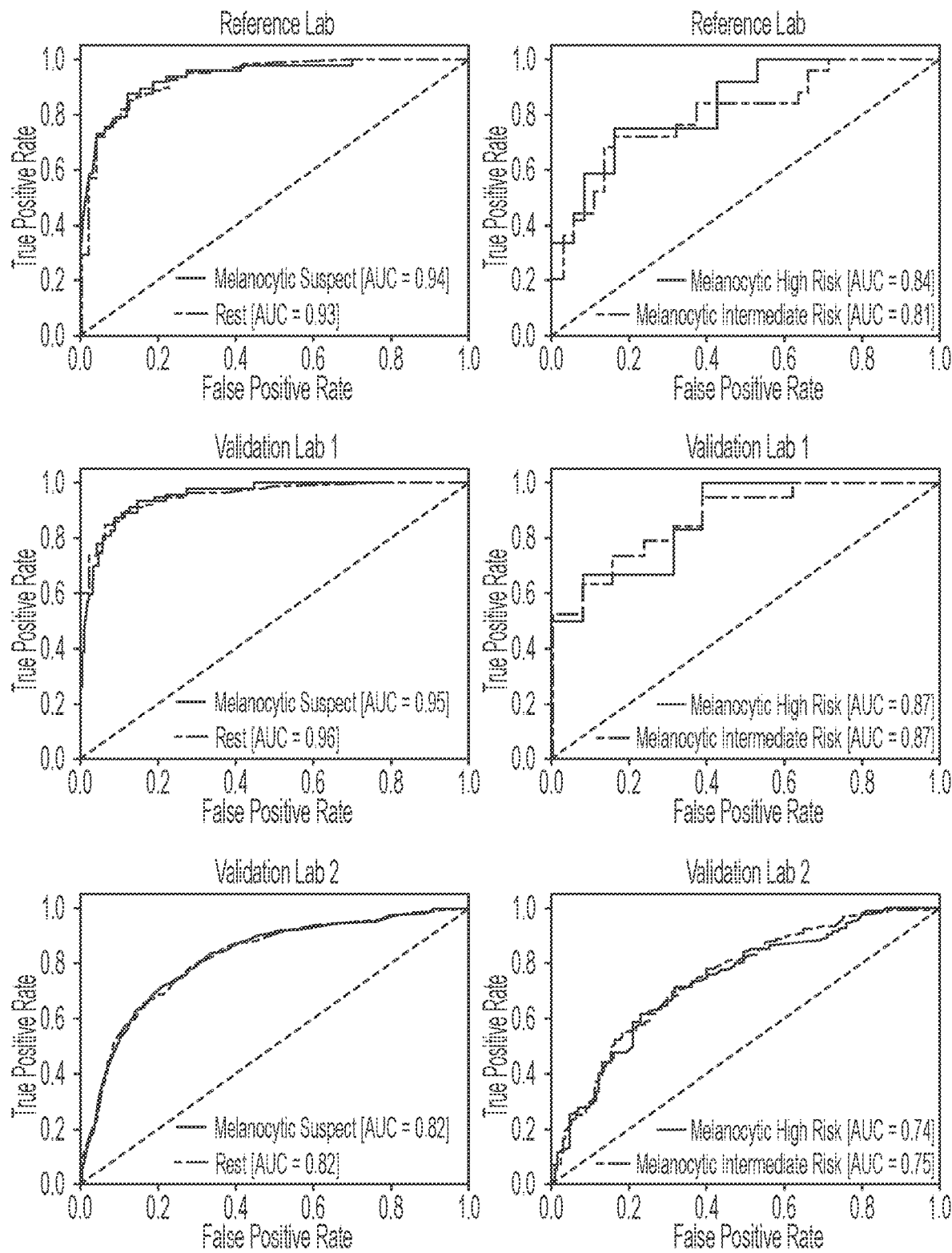
FIG. 12 depicts receiver operating characteristic curves for the neural networks implemented by the reduction to practice of FIG. 6.
Figure 12:
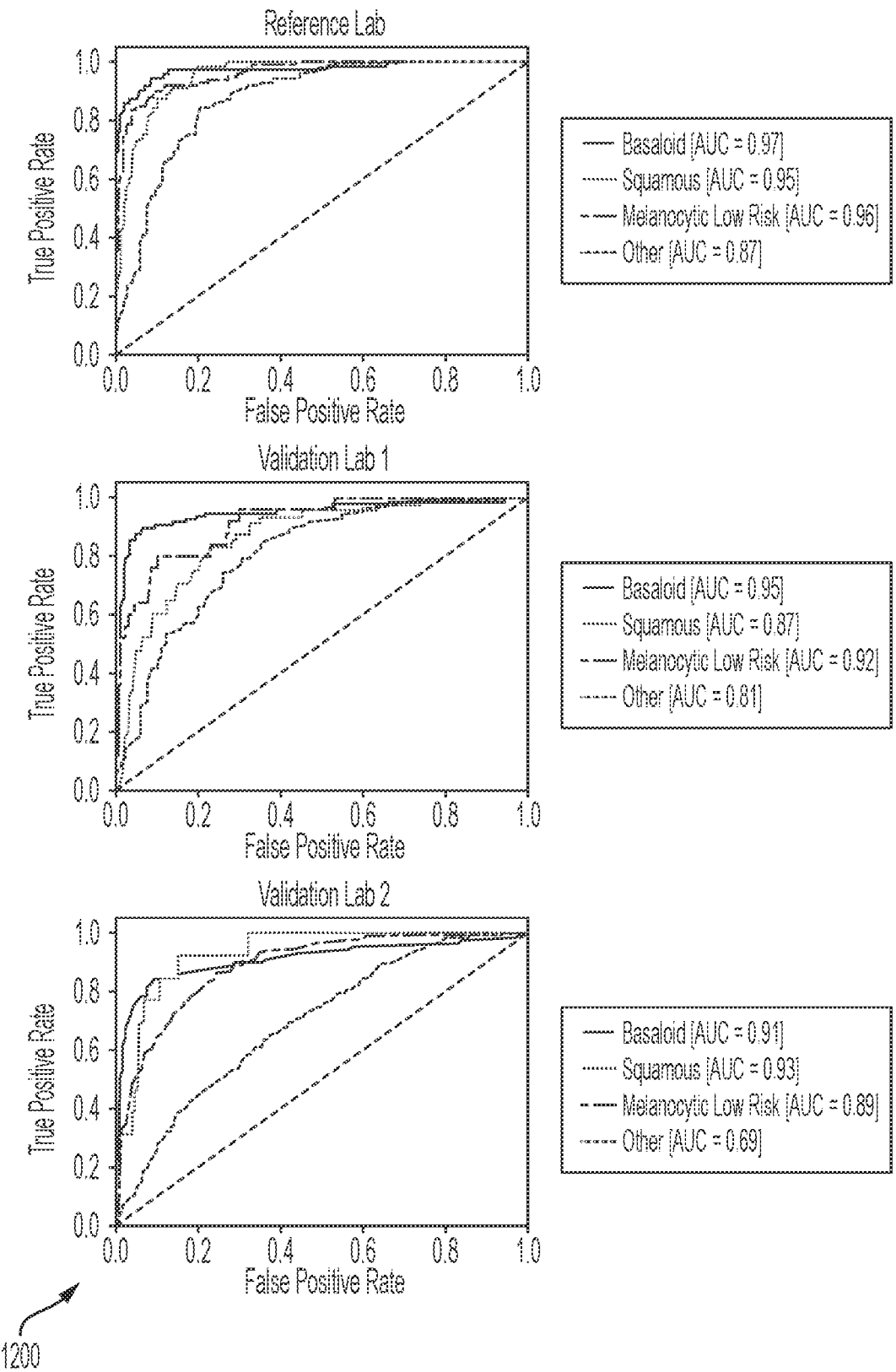

FIG. 12 depicts Receiver Operating Characteristic ("ROC") curves 1200 for the neural networks implemented by the reduction to practice of FIG. 6. In particular, the ROC curves derived from the Reference Lab test dataset for the hierarchal neural networks 632, 634, 636 of the reduction to practice as shown and described in reference to FIG. 6 are depicted in FIG. 12. FIG. 12 depicts such results for the upstream classifier (left column), the High & Melanocytic Intermediate classifier (middle column), and the Basaloid, Squamous, Low Risk Melanocytic & Rest classifier (right column), for the Reference Lab (first row), for Validation Lab 1, (second row), and for Validation Lab 2 (third row).

The Area Underneath the ROC Curve ("AUC") values, calculated with the one-vs-rest scoring scheme, were 0.97, 0.95, 0.87, 0.84, 0.81, 0.93, and 0.96 for the Basaloid, Squamous, Other, Melanocytic High Risk, Melanocytic Intermediate Risk, Melanocytic Suspect, and Melanocytic Low Risk classes, respectively. Table 3 shows the performance of the reduction to practice with respect to diagnostic entities of clinical interest on the Reference Lab test dataset. In particular, Table 3 shows metrics for selected diagnoses of clinical interest, based on the reference Lab test set, representing the classification performance of the individual diagnoses into their higher-level classes: e.g., a correct classification of "Melanoma" is the prediction "Melanocytic High Risk". Results are class-weighted according to the relative prevalence in the test set.

TABLE 3

Metrics for selected diagnoses of clinical interest

| Diagnosis | PPV | Sensitivity | F1 Score | Balanced Accuracy | Support |
|---|---|---|---|---|---|
| Melanoma → Melanocytic High Risk | 0.66 | 0.45 | 0.47 | 0.52 | 23 |
| Melanoma → Melanocytic Suspect | 1.00 | 0.83 | 0.90 | 0.83 | 23 |
| Melanoma in situ → Melanocytic Intermediate Risk | 1.00 | 0.75 | 0.86 | 0.75 | 20 |
| Melanoma in situ → Melanocytic Suspect | 1.00 | 0.85 | 0.92 | 0.85 | 20 |
| Spitz Nevus | 0.00 | 0.00 | 0.00 | 0.00 | 2 |
| Dysplastic Nevus | 0.91 | 0.76 | 0.82 | 0.56 | 61 |
| Dermal Nevus | 1.00 | 0.81 | 0.90 | 0.81 | 28 |
| Compound Nevus | 0.94 | 0.75 | 0.82 | 0.55 | 73 |
| Junctional Nevus | 0.84 | 0.77 | 0.80 | 0.42 | 61 |
| Halo Nevus | 1.00 | 1.00 | 1.00 | 1.00 | 20 |
| Blue Nevus | 1.00 | 0.67 | 0.80 | 0.67 | 68 |
| Squamous Cell Carcinoma | 1.00 | 0.81 | 0.89 | 0.81 | 15 |
| Bowen's Disease | 1.00 | 0.85 | 0.92 | 0.85 | 4 |
| Basal Cell Carcinoma | 1.00 | 0.84 | 0.91 | 0.84 | 8 |

The sensitivity of the reduction to practice to the Melanocytic Suspect class was found to be 0.83, 0.85 for the Melanocytic High and Intermediate risk classes, respectively. The PPV to Melanocytic High Risk was found to be 0.57. The dropout Monte Carlo procedure set the threshold for Melanocytic High Risk classification very high; specimens below this threshold were classified as Melanocytic Suspect, maximizing the sensitivity to this class.

After fine-tuning all three neural networks in the hierarchy through the calibration procedure in each validation lab, the reduction to practice was able to generalize to unseen data from both validation labs as depicted in FIG. 12. Note that fine-tuning was not performed for any of the neural networks in the pre-processing pipeline (Colorization, Ink Detection or ResNet). The ROC curves derived from the Validation Lab 1 and Validation Lab 2 test datasets are shown in FIG. 12. The AUC values for Validation Lab 1 were 0.95, 0.88, 0.81, 0.87, 0.87, 0.95, and 0.92 for the Basaloid, Squamous, Other, Melanocytic High Risk, Intermediate Risk, Suspect, and Low Risk classes, respectively and the AUC values for the same classes for Validation Lab 2 were 0.93, 0.92, 0.69, 0.76, 0.75, 0.82, and 0.92.

F. Consensus Ablation Study

Figure 13:
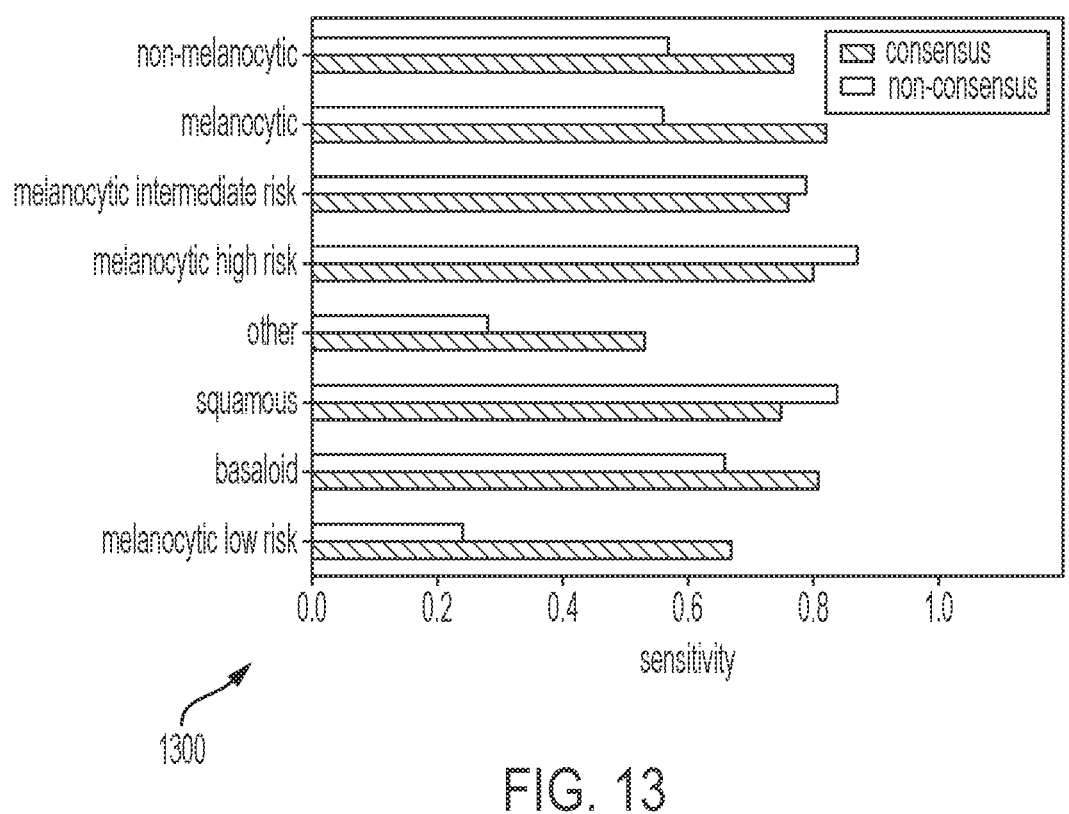
FIG. 13 depicts a chart comparing reference lab performance on the same test set when trained on consensus and non-consensus data.

FIG. 13 depicts a chart 1300 comparing reference lab performance on the same test set when trained on consensus and non-consensus data. The melanocytic class referenced in chart 1300 is defined as the Low, Intermediate and High Risk classes. The sensitivity of the Melanocytic Intermediate and High Risk classes are defined with respect to the reduction to practice classifying these classes as suspect. The PPV to melanocytic high risk in the non-consensus trained model was 0.33, while the consensus model was 0.57.

In general, diagnosing melanocytic cases is challenging. Although some specimens (such as ones diagnosed as compound nevi) clearly exhibit very low risk, and others (such as invasive melanoma) exhibit very high risk of progressing into life threatening conditions, reproducible stratification in the middle of the morphological spectrum has historically proved difficult. The results disclosed in this Section were derived with the reduction to practice trained and evaluated on consensus data: data for which the ground truth melanocytic specimen diagnostic categories were agreed upon by multiple experts. To understand the effect of consensus on training deep learning neural networks, an ablation study was performed by training two hierarchical neural networks. Both neural networks used all non-melanocytic specimens available in the training set. The first neural network was trained only including melanocytic specimens for which consensus was obtained under the diagnostic categories of MPATH I/II, MPATH III, or MPATH IV/V. The other neural network was trained by also including non-consensus data: melanocytic specimens whose diagnostic category was not agreed upon by the experts. To facilitate a fair comparison, validation sets for both neural network versions and a common consensus test set derived from the Reference Lab were reserved. The sensitivities of the reduction to practice to different classes on both consensus and non-consensus data are shown in FIG. 13, where a clear improvement is shown in the sensitivity to the Melanocytic class of over 40% for melanocytic specimens that are annotated with consensus labels over ones that are not; this primarily manifested from a reduction in false positive Melanocytic Suspect classifications.

G. Discussion

This document discloses a reduction to practice capable of automatically sorting and triaging skin specimens with high sensitivity to Melanocytic Suspect cases prior to review by a pathologist. By contrast, prior art techniques may provide diagnostically-relevant information on a potential melanoma specimen only after a pathologist has reviewed the specimen and classified it as a Melanocytic Suspect lesion.

The ability of the reduction to practice to classify suspected melanoma prior to pathologist review could substantially reduce diagnostic turnaround time for melanoma by not only allowing timely review and expediting the ordering of additional tests or stains, but also ensuring that suspected melanoma cases are routed directly to subspecialists. The potential clinical impact of an embodiment with these capabilities is underscored by the fact that early melanoma detection is correlated with improved patient outcomes.

Figure 14:
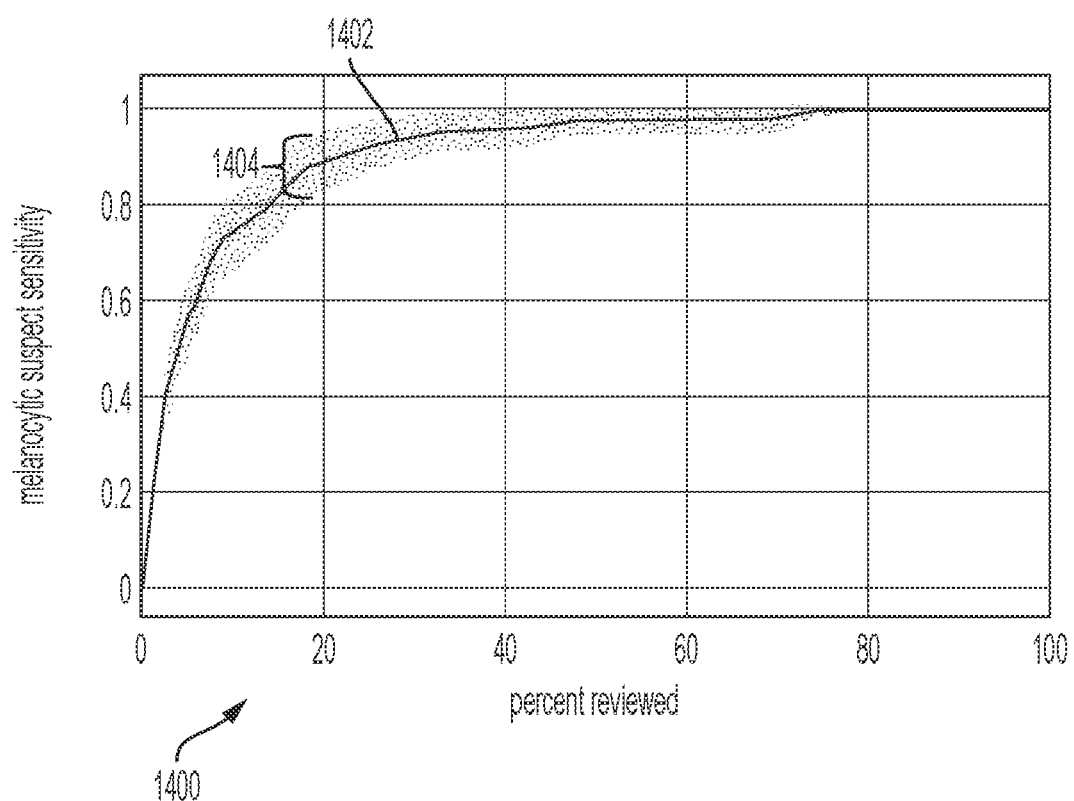
FIG. 14 depicts a chart depicting mean and standard deviation sensitivity to melanoma versus percentage reviewed for 1,000 simulated sequentially accessioned datasets, drawn from reference lab confidence scores.

FIG. 14 depicts a chart 1400 showing mean 1402 and standard deviation 1404 sensitivity to melanoma versus percentage reviewed for 1,000 simulated sequentially accessioned datasets, drawn from reference lab confidence scores. In particular, chart 1400 depicts mean 1402 and standard deviation sensitivity 1404 to melanoma versus percentage reviewed for 1,000 simulated sequentially-accessioned datasets, drawn from Reference Lab confidence scores. In the clinic, 95% of melanoma suspect cases are detected within the first 30% of cases, when ordered by melanoma suspect model confidence.

As the reduction to practice was optimized to maximize melanoma sensitivity, the performance was investigated as a simple Melanocytic Suspect binary classifier. The reduction to practice may be used to sort a pathologist's work list of specimens by the reduction to practice's confidence (in descending order) in the upstream classifier's suspect melanocytic classification. FIG. 10 demonstrates the resulting sensitivity to the Melanocytic Suspect class against the percentage of total specimens that a pathologist would have to review in this sorting scheme in order to achieve that sensitivity. A pathologist would only need between 30% and 60% of the caseload to address all melanoma specimens according to this dataset.

Diagnostic classification of melanocytic lesions remains challenging. There is known lack of consensus among pathologists, and a disturbing lack of intra-pathologist concordance over time was recently reported. Training with consensus data resulted in improved performance seen in classifications excluding Melanocytic Suspect, which has the highest pathologist discordance rates, as show in in Chart 1000. Because pathologists tend to cautiously diagnose a benign lesion as malignant, the reduction to practice learned the same bias in absence of consensus. By training on consensus of multiple dermatopathologists, the reduction to practice may have the unique ability to learn a more consistent feature representation of melanoma and aid in flagging misdiagnosis. While the reduction to practice is highly sensitive to melanoma (84% correctly detected as Intermediate or High Risk in the Reference Lab Test set) there are a large number of false positives (2.7% of sequentially-accessioned specimens in the reference lab were predicted to be suspect) classified as suspect. It may therefore be possible to flag initial diagnoses discordant with the reduction to practice's classification of highly confident predictions for review in order to lower the false positive rate.

The reduction to practice also enables other automated pathology workflows in addition to triage and prioritization of suspected melanoma cases. Sorting and triaging specimens into other classifications such as Basaloid could allow the majority of less complicated cases (such as basal cell carcinoma) to be directly assigned to general pathologists, or to dermatologists who routinely sign out such cases. Relevant to any system designed for clinical use is how well its performance generalizes to sites on which the system was not trained. Performance of the reduction to practice on the Validation Labs after calibration (as shown in FIG. 10) was in many cases close to that of the Reference Lab.

IV. Second Example Reduction to Practice

This Section presents a second example reduction to practice. In the second example reduction to practice, a weakly-supervised attention-based neural network, similar to neural network 200, was trained under a multiple-instance learning paradigm to detect and remove pen ink on a slide. In particular, an attention-based neural network was trained under a multiple-instance learning framework to detect whether or not ink was present on a slide, where the attention-based neural network treated a slide as a bag and tiles from the slide as instances.

The training corpus for the second example reduction to practice included whole-slide images of H&E-stained malignant skin (240 whole-slide images) and prostate (465 whole-slide images) specimens, half with and half without pen ink present. The dataset was randomly partitioned into 70%/15%/15% train/validation/test sets. Each whole-slide image was divided into 128×128 pixel tiles to train the model to classify each whole-slide image as positive or negative for pen ink. Ink-containing regions were identified by iteratively predicting on a whole-slide image with high-attention tiles removed until the prediction became negative, and then automatically excluded from the image. That is, ink-containing regions were identified and removed using an application of at least a portion of method 700.

If both benign and malignant tissue types were represented in the training corpus, the weakly supervised model used to detect ink might instead have learned to identify patterns of malignancy. To avoid this, the training corpus included whole-slide images with and without pen ink from a dataset of skin biopsies, specifically melanocytic tissues (240 whole-slide images; 236 melanomas [in situ: 118, invasive: 118], 3 dysplastic, 1 Spitz) scanned on Ventana DP-200, and from a dataset of prostate biopsies (465 whole-slide images; 182 Gleason grade 6, 201 grade 7, 40 grade 8, 42 grade 9) scanned on Epredia (3D Histech). Whole-slide images were drawn from both source datasets such that 50% of whole-slide images had ink present and 50% did not.

Each whole-slide image was first passed through tissue segmentation stage, and the tissue regions were divided into a bag of 128×128 pixel tiles to train the model. The model included five convolutional layers, two fully connected layers, a single attention head and a single sigmoid-activated output head. The ink detector was trained only on whole-slide-image-level labels, without requiring pixel level annotations. If the output was greater than 0.5, it was interpreted as a positive prediction.

If ink was detected (i.e., the output value was greater than 0.5), the second example reduction to practice used the attention values for each tile to steadily remove highly-attended tiles by iteratively performing inference on subsets of tiles, until the decision of the model changed to "no ink" (i.e., output dropped beneath 0.5) using an application of at least a portion of method 500. After the tiles that contributed to the decision of ink being present were identified, they were removed from the bag, and the scrubbed whole-slide image could be used for downstream training of weakly supervised models. FIG. 8 depicts an application of the second example reduction to practice.

The ink-detection model of the second example reduction to practice achieved 98% balanced accuracy ($F_1$ score=0.98) on 106 withheld test whole-slide images. To demonstrate efficacy of removing ink tiles in downstream modeling, a malignancy-detection model was trained on prostate whole-slide images with and without pen ink excluded to discriminate prostate cancer regions with a Gleason score of at least 6. The model without pen ink removed erroneously focused on ink tiles to achieve strong performance, at 92% balanced accuracy. With ink removed, model performance increased to 95% balanced accuracy, demonstrating a +3% improvement on balanced accuracy and +3% improvement on precision by focusing on regions of malignancy, reducing false positives.

The technique for pen ink removal applied by the second example reduction to practice required no annotations and performed on both skin and prostate images. The technique was not color-dependent, and required no handcrafted or heuristic features to select inked regions. The second example reduction to practice thus demonstrates the importance of removing such seemingly innocuous artifacts from machine learning datasets.

Thus, the first and second reductions to practice demonstrate the advantages of removing seemingly innocuous artifacts from machine learning training corpora. In particular, the first and second reductions to practice show an improvement in performance when pen ink regions are removed from whole-slide images. However, pen ink is one of many commonly occurring quality issues. More broadly, embodiments may be used to detect and remove any artifacts that could adversely bias models if ignored when using weakly supervised learning.

Some further aspects are defined in the following clauses:

Clause 1: A method of training a first electronic neural network classifier to identify a presence of a particular property in a novel supra-image while ignoring a spurious correlation of the presence of the particular property with a presence of an extraneous property, the method comprising: obtaining a training corpus of a plurality of supra-images, each supra-image comprising at least one image, each image of each of the at least one image corresponding to a respective plurality of components, wherein the respective plurality of components for each image of each of the at least one image of each supra-image of the training corpus collectively form a supra-image plurality of components; passing each respective supra-image of the plurality of supra-images of the training corpus through a second electronic neural network classifier trained to identify a presence of the extraneous property, the second electronic neural network classifier comprising an attention layer, whereby the attention layer assigns a respective attention weight to each component of the supra-image plurality of components; identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, wherein each individual component of the supra-image plurality of components that has a respective attention weight above its respective supra-image threshold attention weight corresponds to positive classification by the second electronic neural network classifier, and wherein each individual component of the supra-image plurality of components that has a respective attention weight below its respective supra-image threshold attention weight corresponds to negative classification by the second electronic neural network classifier; removing components of the supra-image plurality of components that have respective attention weights above their respective supra-image threshold attention weights to obtain a scrubbed training corpus;

and training the first electronic neural network classifier to identify the presence of the particular property using the scrubbed training corpus.

Clause 2: The method of Clause 1, wherein the extraneous property comprises a pen marking.

Clause 3: The method of Clause 1 or Clause 2, wherein the identifying, for each supra-image of the plurality of supra-images of the training corpus that have a positive classification by the second electronic neural network classifier, a respective supra-image threshold attention weight comprises conducting, for each supra-image of the plurality of supra-images of the training corpus, a respective binary search of its components.

Clause 4: The method of any of Clauses 1-3, wherein the conducting, for each supra-image of the plurality of supra-images of the training corpus, a respective binary search of its components comprises: ordering components of each supra-image of the plurality of supra-images of the training corpus according to their respective attention weights to form a respective ordered sequence for each supra-image of the plurality of supra-images of the training corpus; and iterating, for each respective ordered sequence: splitting the respective ordered sequence into a respective low part and a respective high part, passing the respective low part through the second electronic neural network classifier to obtain a respective low part classification, setting the respective ordered sequence to its respective low part when its respective low part classification is positive, and setting the respective ordered sequence to its respective high part when its respective low part classification is not positive.

Clause 5: The method of any of Clauses 1-4, wherein each component of the supra-image plurality of components comprises a 128-pixel-by-128-pixel square portion of an image.

Clause 6: The method of any of Clauses 1-5, wherein each component of the supra-image plurality of components comprises a feature vector corresponding to a portion of an image.

Clause 7: The method of any of Clauses 1-6, wherein the training corpus comprises a plurality of biopsy supra-images.

Clause 8: The method of any of Clauses 1-7, wherein the particular property comprises a dermatopathology property.

Clause 9: The method of Clause 8, wherein the dermatopathology property comprises one of: a presence of a malignancy, a presence of a specific grade of malignancy, or a presence of a category of risk.

Clause 10: The method of any of Clauses 1-9, further comprising identifying the presence of the particular property in the novel supra-image by submitting the novel supra-image to the first electronic neural network classifier.

Clause 11: The method of any of Clauses 1-10, wherein the training corpus comprises a plurality of biopsy supra-images.

Clause 12: The method of any of Clauses 1-11, wherein each image comprises a whole-slide image.

Clause 13: A system for training a first electronic neural network classifier to identify a presence of a particular property in a novel supra-image while ignoring a spurious correlation of the presence of the particular property with a presence of an extraneous property, the system comprising: a processor; and a memory communicatively coupled to the processor, the memory storing instructions which, when executed on the processor, perform operations comprising: obtaining a training corpus of a plurality of supra-images, each supra-image comprising at least one image, each image of each of the at least one image corresponding to a respective plurality of components, wherein the respective plurality of components for each image of each of the at least one image of each supra-image of the training corpus collectively form a supra-image plurality of components; passing each respective supra-image of the plurality of supra-images of the training corpus through a second electronic neural network classifier trained to identify a presence of the extraneous property, the second electronic neural network classifier comprising an attention layer, whereby the attention layer assigns a respective attention weight to each component of the supra-image plurality of components; identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, wherein each individual component of the supra-image plurality of components that has a respective attention weight above its respective supra-image threshold attention weight corresponds to positive classification by the second electronic neural network classifier, and wherein each individual component of the supra-image plurality of components that has a respective attention weight below its respective supra-image threshold attention weight corresponds to negative classification by the second electronic neural network classifier; removing components of the supra-image plurality of components that have respective attention weights above their respective supra-image threshold attention weights to obtain a scrubbed training corpus; and training the first electronic neural network classifier to identify the presence of the particular property using the scrubbed training corpus.

Clause 14: The system of Clause 13, wherein the extraneous property comprises a pen marking.

Clause 15: The system of Clause 13 or Clause 14, wherein the identifying, for each supra-image of the plurality of supra-images of the training corpus that have a positive classification by the second electronic neural network classifier, a respective supra-image threshold attention weight comprises conducting, for each supra-image of the plurality of supra-images of the training corpus, a respective binary search of its components.

Clause 16: The system of any of Clauses 13-15, wherein the conducting, for each supra-image of the plurality of supra-images of the training corpus, a respective binary search of its components comprises: ordering components of each supra-image of the plurality of supra-images of the training corpus according to their respective attention weights to form a respective ordered sequence for each supra-image of the plurality of supra-images of the training corpus; and iterating, for each respective ordered sequence: splitting the respective ordered sequence into a respective low part and a respective high part, passing the respective low part through the second electronic neural network classifier to obtain a respective low part classification, setting the respective ordered sequence to its respective low part when its respective low part classification is positive, and setting the respective ordered sequence to its respective high part when its respective low part classification is not positive.

Clause 17: The system of any of Clauses 13-16, wherein each component of the supra-image plurality of components comprises a 128-pixel-by pixel square portion of an image.

Clause 18: The system of any of Clauses 13-16, wherein each component of the supra-image plurality of components comprises a feature vector corresponding to a portion of an image.

Clause 19: The system of any of Clauses 13-18, wherein the training corpus comprises a plurality of biopsy supra-images.

Clause 20: The system of any of Clauses 13-19, wherein the particular property comprises a dermatopathology property.

Clause 21: The system of Clause 20, wherein the dermatopathology property comprises one of: a presence of a malignancy, a presence of a specific grade of malignancy, or a presence of a category of risk.

Clause 22: The system of any of Clauses 13-21, wherein the operations further comprise identifying the presence of the particular property in the novel supra-image by submitting the novel supra-image to the first electronic neural network classifier.

Clause 23: A method of identifying, for a supra-image having a positive classification for a presence of a property by a trained electronic neural network classifier, wherein the trained electronic neural network classifier comprises an attention layer, wherein the supra-image comprises at least one image, wherein each image of the at least one image corresponds to a respective plurality of components, wherein the respective plurality of components for each image of the at least one image collectively form a global plurality of components, at least one component of the global plurality of components that is determinative of the positive classification of the supra-image, the method comprising: classifying the supra-image by the trained electronic neural network classifier, whereby the attention layer assigns a respective attention weight to each component of the global plurality of components; identifying a threshold attention weight, wherein individual components of the global plurality of components having attention weights above the threshold attention weight correspond to a positive classification by the trained electronic neural network, and wherein individual components of the global plurality of components having attention weights below the threshold attention weight correspond to a negative classification by the trained electronic neural network; and identifying, as the at least one component of the global plurality of components that is determinative of the positive classification of the supra-image, the individual components of the global plurality of components having attention weights above the threshold attention weight.

Clause 24: The method of Clause 23, wherein the identifying the threshold attention weight comprises conducting a binary search of the global plurality of components.

Clause 25: The method of Clause 23 or Clause 24, wherein the conducting the binary search comprises: ordering the global plurality of components according to their respective attention weights, whereby an ordered sequence is obtained; and iterating: splitting the ordered sequence into a low part and a high part, passing the low part through the trained electronic neural network classifier to obtain a low part classification, setting the ordered sequence to the low part when the low part classification is positive, and setting the ordered sequence to the high part when the low part classification is not positive.

Clause 26: The method of any of Clauses 23-25, wherein each component of the global plurality of components comprises a 128-pixel-by-128-pixel square portion of an image of the at least one image.

Clause 27: The method of any of Clauses 23-25, wherein each component of the global plurality of components comprises a feature vector corresponding to a portion of an image of the at least one image.

Clause 28: The method of any of Clauses 23-26, wherein the supra-image represents a biopsy.

Clause 29: The method of any of Clauses 23-28, wherein each image of the at least one image comprises a whole-slide image.

Clause 30: The method of any of Clauses 23-29, wherein the property comprises at least one pen marking.

Clause 31: The method of any of Clauses 23-30, wherein the property comprises a dermatopathology property.

Clause 32: The method of any of Clauses 23-31, wherein the dermatopathology property comprises one of: a presence of a malignancy, a presence of a specific grade of malignancy, or a presence of a category of risk.

Clause 33: The method of any of Clauses 23-32, further comprising: removing the components of the global plurality of components having attention weights above the threshold attention weight from the supra-image, whereby a scrubbed supra-image is produced; including the scrubbed supra-image in a training corpus; and training a second electronic neural network classifier using the training corpus.

Clause 34: At least one non-transitory computer readable medium comprising computer readable instructions that, when executed by at least one electronic processor, configure the at least one electronic processor to perform operations of any of Clauses 1-12 or 23-33.

Clause 35: An electronic computer comprising at least one electronic processor communicatively coupled to electronic persistent memory comprising instructions that, when executed by the at least one processor, configure the at least one processor to perform operations of any of Clauses 1-12 or 23-33.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

Note that any of the following claims may be combined with any other of the following claims to the extent that antecedent bases for terms in such are clear.

What is claimed is:

1. A method of training a first electronic neural network classifier to identify a presence of a particular property in a novel supra-image while ignoring a spurious correlation of the presence of the particular property with a presence of an extraneous property, the method comprising:

obtaining a training corpus of a plurality of supra-images, each supra-image comprising at least one image, each image of each of the at least one image corresponding to a respective plurality of components, wherein the respective plurality of components for each image of each of the at least one image of each supra-image of the training corpus collectively form a supra-image plurality of components;

passing each respective supra-image of the plurality of supra-images of the training corpus through a second electronic neural network classifier trained to identify a presence of the extraneous property, the second electronic neural network classifier comprising an attention layer, whereby the attention layer assigns a respective attention weight to each component of the supra-image plurality of components;

identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, wherein each individual component of the supra-image plurality of components that has a respective attention weight above its respective supra-image threshold attention weight corresponds to positive classification by the second electronic neural network classifier, and wherein each individual component of the supra-image plurality of components that has a respective attention weight below its respective supra-image threshold attention weight corresponds to negative classification by the second electronic neural network classifier;

removing components of the supra-image plurality of components that have respective attention weights above their respective supra-image threshold attention weights to obtain a scrubbed training corpus; and training the first electronic neural network classifier to identify the presence of the particular property using the scrubbed training corpus.

2. The method of claim 1, wherein the extraneous property comprises a pen marking.

3. The method of claim 1, wherein the identifying, for each supra-image of the plurality of supra-images of the training corpus that have a positive classification by the second electronic neural network classifier, a respective supra-image threshold attention weight comprises conducting, for each supra-image of the plurality of supra-images of the training corpus, a respective binary search of its components.

4. The method of claim 3, wherein the conducting, for each supra-image of the plurality of supra-images of the training corpus, a respective binary search of its components comprises:

ordering components of each supra-image of the plurality of supra-images of the training corpus according to their respective attention weights to form a respective ordered sequence for each supra-image of the plurality of supra-images of the training corpus; and iterating, for each respective ordered sequence:
splitting the respective ordered sequence into a respective low part and a respective high part,
passing the respective low part through the second electronic neural network classifier to obtain a respective low part classification,
setting the respective ordered sequence to its respective low part when its respective low part classification is positive, and
setting the respective ordered sequence to its respective high part when its respective low part classification is not positive.

5. The method of claim 1, wherein each component of the supra-image plurality of components comprises a 128-pixel-by-128-pixel square portion of an image.

6. The method of claim 1, wherein each component of the supra-image plurality of components comprises a feature vector corresponding to a portion of an image.

7. The method of claim 1, wherein the training corpus comprises a plurality of biopsy supra-images.

8. The method of claim 1, wherein the particular property comprises a dermatopathology property.

9. The method of claim 8, wherein the dermatopathology property comprises one of: a presence of a malignancy, a presence of a specific grade of malignancy, or a presence of a category of risk.

10. The method of claim 1, further comprising identifying the presence of the particular property in the novel supra-image by submitting the novel supra-image to the first electronic neural network classifier.

11. A system for training a first electronic neural network classifier to identify a presence of a particular property in a novel supra-image while ignoring a spurious correlation of the presence of the particular property with a presence of an extraneous property, the system comprising:

a processor; and
a memory communicatively coupled to the processor, the memory storing instructions which, when executed on the processor, perform operations comprising:

obtaining a training corpus of a plurality of supra-images, each supra-image comprising at least one image, each image of each of the at least one image corresponding to a respective plurality of components, wherein the respective plurality of components for each image of each of the at least one image of each supra-image of the training corpus collectively form a supra-image plurality of components;

passing each respective supra-image of the plurality of supra-images of the training corpus through a second electronic neural network classifier trained to identify a presence of the extraneous property, the second electronic neural network classifier comprising an attention layer, whereby the attention layer assigns a respective attention weight to each component of the supra-image plurality of components;

identifying, for each supra-image of the plurality of supra-images of the training corpus that have a positive classification by the second electronic neural network classifier, a respective supra-image threshold attention weight, whereby each component of the supra-image plurality of components is associated with a respective supra-image threshold attention weight, wherein each individual component of the supra-image plurality of components that has a respective attention weight above its respective supra-image threshold attention weight corresponds to positive classification by the second electronic neural network classifier, and wherein each individual component of the supra-image plurality of components that has a respective attention weight below its respective supra-image threshold attention weight corresponds to negative classification by the second electronic neural network classifier;

removing components of the supra-image plurality of components that have respective attention weights above their respective supra-image threshold attention weights to obtain a scrubbed training corpus; and training the first electronic neural network classifier to identify the presence of the particular property using the scrubbed training corpus.

12. The system of claim 11, wherein the extraneous property comprises a pen marking.

13. The system of claim 11, wherein the identifying, for each supra-image of the plurality of supra-images of the training corpus that have a positive classification by the second electronic neural network classifier, a respective supra-image threshold attention weight comprises conducting, for each supra-image of the plurality of supra-images of the training corpus, a respective binary search of its components.

14. The system of claim 13, wherein the conducting, for each supra-image of the plurality of supra-images of the training corpus, a respective binary search of its components comprises:

ordering components of each supra-image of the plurality of supra-images of the training corpus according to their respective attention weights to form a respective ordered sequence for each supra-image of the plurality of supra-images of the training corpus; and iterating, for each respective ordered sequence:

splitting the respective ordered sequence into a respective low part and a respective high part, passing the respective low part through the second electronic neural network classifier to obtain a respective low part classification, setting the respective ordered sequence to its respective low part when its respective low part classification is positive, and setting the respective ordered sequence to its respective high part when its respective low part classification is not positive.

15. The system of claim 11, wherein each component of the supra-image plurality of components comprises a 128-pixel-by-128-pixel square portion of an image.

16. The system of claim 11, wherein each component of the supra-image plurality of components comprises a feature vector corresponding to a portion of an image.

17. The system of claim 11, wherein the training corpus comprises a plurality of biopsy supra-images.

18. The system of claim 11, wherein the particular property comprises a dermatopathology property.

19. The system of claim 18, wherein the dermatopathology property comprises one of: a presence of a malignancy, a presence of a specific grade of malignancy, or a presence of a category of risk.

20. The system of claim 11, wherein the operations further comprise identifying the presence of the particular property in the novel supra-image by submitting the novel supra-image to the first electronic neural network classifier.

* * * * *